United States Patent [19]
Krishnan et al.

[11] Patent Number: 6,073,124
[45] Date of Patent: Jun. 6, 2000

[54] METHOD AND SYSTEM FOR SECURELY INCORPORATING ELECTRONIC INFORMATION INTO AN ONLINE PURCHASING APPLICATION

[75] Inventors: Ganapathy Krishnan, Bellevue; John Guthrie; Scott Oyler, both of Seattle, all of Wash.

[73] Assignee: ShopNow.com Inc., Seattle, Wash.

[21] Appl. No.: 08/895,221

[22] Filed: Jul. 15, 1997

Related U.S. Application Data

[63] Continuation-in-part of application No. 08/792,719, Jan. 29, 1997
[60] Provisional application No. 60/049,844, Jun. 17, 1997.
[51] Int. Cl.$^7$ .................................................... G06F 17/60
[52] U.S. Cl. ................................. 705/59; 705/51; 705/26
[58] Field of Search ................................... 705/1, 18, 21, 705/26, 51, 59; 380/3, 4, 23, 24, 25, 277

[56] References Cited

U.S. PATENT DOCUMENTS

| | | | |
|---|---|---|---|
| 5,005,122 | 4/1991 | Griffin et al. | 709/203 |
| 5,337,357 | 8/1994 | Chou et al. | 380/4 |
| 5,390,297 | 2/1995 | Barber et al. | 364/280 |
| 5,530,752 | 6/1996 | Rubin | 380/4 |
| 5,553,143 | 9/1996 | Ross et al. | 380/25 |
| 5,592,549 | 1/1997 | Nagel et al. | 380/4 |
| 5,708,709 | 1/1998 | Rose | 380/4 |
| 5,710,887 | 1/1998 | Chelliah et al. | 705/26 |

(List continued on next page.)

FOREIGN PATENT DOCUMENTS

| | | |
|---|---|---|
| 0 667 572 A1 | 8/1995 | European Pat. Off. ........ G06F 9/445 |
| 0 704 785 A2 | 4/1996 | European Pat. Off. .......... G06F 1/00 |
| WO 97/14087 | 4/1997 | European Pat. Off. . |
| 0 778 512 A2 | 6/1997 | European Pat. Off. .......... G06F 1/00 |
| 0 795 809 A2 | 9/1997 | European Pat. Off. .......... G06F 1/00 |

OTHER PUBLICATIONS

T. Berners–Lee et al., "Hypertext Transfer Protocol—HTTP 1.0," Request for Comments (RFC) 1945, MIT/LCS, May, 1996.

T. Berners–Lee et al., "Uniform Resource Locators (URL)," RFC 1738, CERN, Xerox PARC, Univ. of Minn., Dec., 1994.

(List continued on next page.)

*Primary Examiner*—James P. Trammell
*Assistant Examiner*—Nicholas David Rosen
*Attorney, Agent, or Firm*—Perkins Coie LLP

[57] ABSTRACT

A method and system for facilitating digital commerce using a secure digital commerce system is provided. The secure digital commerce system is arranged according to a client/server architecture and includes a modularized DCS client and DCS server. The DCS client and the DCS server are incorporated into an online purchasing system, such as a virtual store, to perform the purchase and online delivery of electronic content. The DCS client includes a set of components which include a secured copy of the merchandise and various components needed to license and purchase the merchandise and to unsecure and process (e.g., execute) the licensed merchandise. The DCS client communicates with the DCS server to download the components onto a customer's computer system and to license and purchase a requested item of merchandise. The DCS server, which includes a content supplier server, a licensing and purchasing broker, and a payment processing function, supplies merchandise-specific components and licenses the requested item of merchandise by generating an electronic certificate. The electronic certificate contains license parameters that are specific to the requested merchandise and an indicated purchasing option. Once a valid electronic license certificate for the requested merchandise is received by the DCS client, the merchandise is made available to the customer for use in accordance with the licensing parameters contained in the electronic license certificate.

16 Claims, 21 Drawing Sheets

U.S. PATENT DOCUMENTS

| | | | |
|---|---|---|---|
| 5,724,424 | 3/1998 | Gifford | 380/24 |
| 5,757,908 | 5/1998 | Cooper et al. | 380/4 |
| 5,758,068 | 5/1998 | Brandt et al. | 713/200 |
| 5,758,069 | 5/1998 | Olsen | 713/201 |
| 5,778,173 | 7/1998 | Apte | 380/25 |
| 5,794,259 | 8/1998 | Kikinis | 707/507 |
| 5,805,802 | 9/1998 | Marx | 380/4 |
| 5,845,070 | 12/1998 | Ikudome | 380/25 |
| 5,895,454 | 4/1999 | Harrington | 705/26 |
| 5,897,622 | 4/1999 | Blinn et al. | 705/26 |
| 5,898,777 | 4/1999 | Tycksen, Jr. et al. | 380/4 |
| 5,909,492 | 6/1999 | Payne et al. | 380/24 |
| 5,918,213 | 6/1999 | Bernard et al. | 705/26 |
| 5,940,807 | 8/1999 | Purcell | 705/26 |

OTHER PUBLICATIONS

T. Berners–Lee and D. Connolly, "Hypertext Markup Language–2.0," RFC 1866, MIT/W3C, Nov., 1995.

J. O'Donnell et al., "Special Edition Using Microsoft Internet Explorer 3," *QUE Corp.*, Table of Contents, 1996.

Schneier, Bruce, "Applied Cryptography," John Wiley & Sons, Inc., Table of Contents, 1994.

Digital's EDI Services, Jul. 26, 1997.

Patterson, Wayne, "Mathematical Cryptology for Computer Scientists and Mathematicians," Rowman & Littlefield, 1987. Table of Contents.

Encrypted Message Protocol

METHOD AND SYSTEM FOR SECURELY INCORPORATING ELECTRONIC INFORMATION INTO AN ONLINE PURCHASING APPLICATION

CROSS-REFERENCE TO RELATED APPLICATIONS

This application is a continuation-in-part of a U.S. Provisional Application No. 60/049,844, entitled "A Method and System of Securely Incorporating Digital Information into an Electronic Store," filed on Jun. 17, 1997, which is hereby incorporated by reference in its entirety. This application is also a continuation-in-part of U.S. patent application Ser. No. 08/792,719, entitled "Method and System for Injecting New Code Into Existing Application Code," filed on Jan. 29, 1997, and which is hereby incorporated by reference in its entirety.

TECHNICAL FIELD

The present invention relates to facilitating the purchase of electronic information using digital commerce and, in particular, to providing a component-based architecture that facilitates online licensing and purchase of digital content and software.

BACKGROUND OF THE INVENTION

Today's computer networking environments, such as the Internet, offer an unprecedented medium for facilitating the purchase of software and digital content online. Electronic software distribution (ESD) provides an online alternative (using computers) for a customer to purchase software and other types of digital content from publishers, resellers, and distributors without the physical distribution of a shrink-wrapped product. This online process is referred to as digital commerce. The customer purchases and downloads the software or other digital content directly from the network. In the context of this specification, software is generally a computer program, which is self-executing, whereas digital content that is not software is data that serves as input to another computer program. For example, audio content is digital content (an audio script) that is played and heard by executing an audio player (a computer program) to process the audio script. This act of processing is referred to as "executing" the digital content. For the purposes of this specification, self-executing content and other digital content, as well as any other type of electronic information that can be licensed or purchased, including combinations of content and a player for that content, will be referred to generically as electronic information, electronic data, or electronic content.

One of the major problems that authors of electronic content face using digital commerce is a reliable mechanism for obtaining payment for their electronic content. One reason is that it has become increasingly easy, without the use of secure licensing code, to copy and widely distribute electronic content. To limit the use of illegal copies of electronic content, current systems have incorporated licensing code into existing application programs to be electronically distributed using various solutions. According to one technique, which will be referred to herein as "wrapping," a second application program (a wrapper program) is distributed on the network, which includes an encrypted version of the original application program. The wrapper program, when installed, decrypts the encrypted original application program and then proceeds to execute the original application program. To successfully decrypt the program, a legitimate end user must provide the proper licensing information to enable the decryption to operate. A security hole exists, however, in that, while the wrapping program is in the process of decrypting the original application executable file, temporary files are created to hold the decrypted program code. Once the entire original application program has been decrypted and stored in the temporary file, a "software pirate" can then make multiple copies of the original unencrypted application program in the temporary file and can distribute them illegally.

Further, use of the wrapping technique to incorporate licensing provides only limited additional security to a vendor who implements what is known as a "try and buy" licensing model. A try and buy licensing model typically distributes an application program with either limited functionality or for a limited time of use to enable a potential customer to explore the application. Functionality may be limited, for example, by disabling a set of features. Once the potential customer is satisfied, the customer can pay for and license the application program for more permanent use. If an application program is distributed using the wrapping technique to potential customers for the purpose of try and buy licensing, then, when the application program is decrypted and stored in a temporary file, a software pirate can determine how to enable the disabled features or how to remove the license expiration data. These security problems can result in the distribution of illegal copies, which are hard to detect and monitor in a global network environment.

A second technique for incorporating licensing code into an existing application program directly inserts the licensing code into the executable file. Using the direct insertion method, an application developer determines where in the executable file the licensing code should be placed and inserts the new code into the executable. After inserting the licensing code into the existing executable file, the application developer adjusts addresses that reference any relocatable code or data that follows the inserted code to account for the newly added code. However, it is very difficult for an application developer to determine where to insert the licensing code and to then test the entire application to ensure it works correctly. An application developer would typically need to disassemble the executable file and study the disassembled code to determine where to insert the licensing code. Such disassembling and studying is a very time-consuming process. Furthermore, the process must be repeated for each application program, and for each version of each application program in which the code is to be inserted.

In addition to problems relating to obtaining payment due to illegal distribution, the current methods for incorporating licensing code and for supporting digital commerce present scalability problems. For example, it is difficult for these systems to handle large volumes and numerous types of electronic content because any change to the licensing or purchasing model requires re-encryption and perhaps re-wrapping of the electronic content. In addition, it is difficult to distribute such content online when the content is large in size because the network connection may be prone to failures. A failure in a network connection when downloading the electronic content would require starting the download operation again.

To perform digital commerce, today's computer networking environments utilize a client/server architecture and a standard protocol for communicating between various network sites. One such network, the World Wide WEB network, which comprises a subset of Internet sites, supports a standard protocol for requesting and for receiving documents known as WEB pages. This protocol is known as the Hypertext Transfer Protocol, or "HTTP." HTTP defines a high-level message passing protocol for sending and receiving packets of information between diverse applications. Details of HTTP can be found in various documents including T. Berners-Lee et al., *Hypertext Transfer Protocol— HTTP 1.0*, Request for Comments (RFC) 1945, MIT/LCS, May, 1996, which is incorporated herein by reference. Each HTTP message follows a specific layout, which includes among other information a header, which contains information specific to the request or response. Further, each HTTP message that is a request (an HTTP request message) contains a universal resource identifier (a "URI"), which specifies a target network resource for the request. A URI is either a Uniform Resource Locator ("URL") or Uniform Resource Name ("URN"), or any other formatted string that identifies a network resource. The URI contained in a request message, in effect, identifies the destination machine for a message. URIs, as an example of URIs, are discussed in detail in T. Berners-Lee, et al., *Uniform Resource Locators (URL)*, RFC 1738, CERN, Xerox PARC, Univ. of Minn., December, 1994, which is incorporated herein by reference.

FIG. 1 illustrates how a browser application, using the client/server model of the World Wide WEB network, enables users to navigate among network nodes by requesting and receiving WEB pages. For the purposes of this specification, a WEB page is any type of document that abides by the HTML format. That is, the document includes an "<HTML>" statement. Thus, a WEB page can also be referred to as an HTML document or an HTML page. HTML is a document mark-up language, defined by the Hypertext Markup Language ("HTML") specification. HTML defines tags for specifying how to interpret the text and images stored in an HTML page. For example, there are HTML tags for defining paragraph formats and text attributes such as boldface and underlining. In addition, the HTML format defines tags for adding images to documents and for formatting and aligning text with respect to images. HTML tags appear between angle brackets, for example, <HTML>. Further details of HTML are discussed in T. Berners-Lee and D. Connolly, *Hypertext Markup Language-2.0*, RFC 1866, MIT/W3C, November, 1995, which is incorporated herein by reference.

In FIG. 1, a WEB browser application 101 is shown executing on a client computer system 102, which communicates with a server computer system 103 by sending and receiving HTTP packets (messages). The WEB browser application 101 requests WEB pages from other locations on the network to browse (display) what is available at these locations. This process is known as "navigating" to sites on the WEB network. In particular, when the WEB browser application 101 "navigates" to a new location, it requests a new page from the new location (e.g., server computer system 103) by sending an HTTP-request message 104 using any well-known underlying communications wire protocol. HTTP-request message 104 follows the specific layout discussed above, which includes a header 105 and a URI field 106, which specifies the target network location for the request. When the server computer system machine specified by URI 106 (e.g., the server computer system 103) receives the HTTP-request message, it decomposes the message packet and processes the request. When appropriate, the server computer system constructs a return message packet to send to the source location that originated the message (e.g., the client computer system 102) in the form of an HTTP-response message 107. In addition to the standard features of an HTTP message, such as the header 108, the HTTP-response message 107 contains the requested WEB page 109. When the HTTP-response message 107 reaches the client computer system 102, the WEB browser application 101 extracts the WEB page 109 from the message, and parses and interprets the HTML code in the page (executes the WEB page) in order to display the document on a display screen of the client computer system 102 in accordance with the HTML tags.

SUMMARY OF THE INVENTION

The present invention provides methods and systems for facilitating the purchase and delivery of electronic content using a secure digital commerce system. The secure digital commerce system interacts with an online purchasing system to purchase and distribute merchandise over a network. The secure digital commerce system is comprised of a plurality of modularized components, which communicate with each other to download, license, and potentially purchase a requested item of merchandise. Each component is customizable.

Exemplary embodiments of the secure digital commerce system ("DCS") include a DCS client and a DCS server. The DCS client includes a plurality of client components, which are downloaded by a boot program onto a customer computer system in response to requesting an item of merchandise to be licensed or purchased. The downloaded client components include a secured (e.g., encrypted) content file that corresponds to the content of the requested item and licensing code that is automatically executed to ensure that the item of merchandise is properly licensed before a customer is permitted to operate it. The DCS server includes a content supplier server, which provides the DCS client components that are specific to the requested item, and a licensing and purchasing broker, which generates and returns a secure electronic licensing certificate in response to a request to license the requested item of merchandise. The generated electronic license certificate contains licensing parameters that dictate whether the merchandise is permitted to be executed. Thus, once properly licensed, the downloaded client components in conjunction with the electronic license certificate permit a legitimate customer to execute (process) purchased content in a manner that helps prevent illegitimate piracy.

In one embodiment, the electronic license certificate is generated from tables stored in a password generation data repository. Each table contains fields that are used to generate the license parameters. Each electronic license certificate is generated specifically for a particular item of merchandise and for a specific customer request. Also, the electronic license certificate is secured, such as by encryption, to prevent a user from accessing the corresponding item of merchandise without proper authorization. One technique for securing the electronic license certificate uses a symmetric cryptographic algorithm.

The secure digital commerce system also supports the ability to generate emergency electronic license certificates in cases where an electronic license certificate would not normally be authorized. To accomplish this objective, a separate emergency password generation table is provided by the password generation data repository. In addition, the secure digital commerce system reliably downloads the client components even when a failure is encountered during the download procedure. Further, a minimum number of components are downloaded.

In addition to generating electronic license certificates, the licensing and purchasing broker may also include access to a payment processing function, which is invoked to authorize a particular method of payment for a particular transaction. The licensing and purchasing broker may also include access to a clearinghouse function used to track and audit purchases.

Digital commerce is performed using the secure digital commerce system as follows. A customer invokes an online purchasing system to request an item of merchandise and to indicate a purchasing option (such as "try" or "buy"). The DCS client then downloads onto a customer computer system the client components that are associated with the requested item. Included in these components is a secured content component. The secured content component is then installed and executed (processed) in a manner that automatically invokes licensing code. The licensing code, when the requested item is not yet licensed properly, causes the requested item to be licensed by the licensing and purchasing broker in accordance with the indicated purchasing option before the content component becomes operable. Specifically, the licensing and purchasing broker generates a secure electronic license certificate and completes an actual purchase when appropriate. The broker then returns the electronic license certificate to the licensing code, which unsecures (e.g., unencrypts) and deconstructs the electronic license certificate to determine the licensing parameters. The licensing code then executes (processes) the content component in accordance with the license parameters.

In some embodiments, the secure digital commerce system supports the licensing and purchasing of both merchandise that is deliverable online and merchandise that requires physical shipment of a product or service (e.g., non-ESD merchandise).

DETAILED DESCRIPTION OF THE INVENTION

Exemplary embodiments of the present invention provide methods and systems for facilitating secure digital commerce of electronic content. The secure digital commerce system interacts with an online purchasing system, such as a virtual store, to facilitate the purchase and distribution of merchandise over a network, such as the Internet or the World Wide WEB network (the WEB). For the purposes of this specification, a virtual store is any executable file, data, or document (for example, a WEB page) that enables a user to electronically purchase merchandise over a network.

Figure 1:
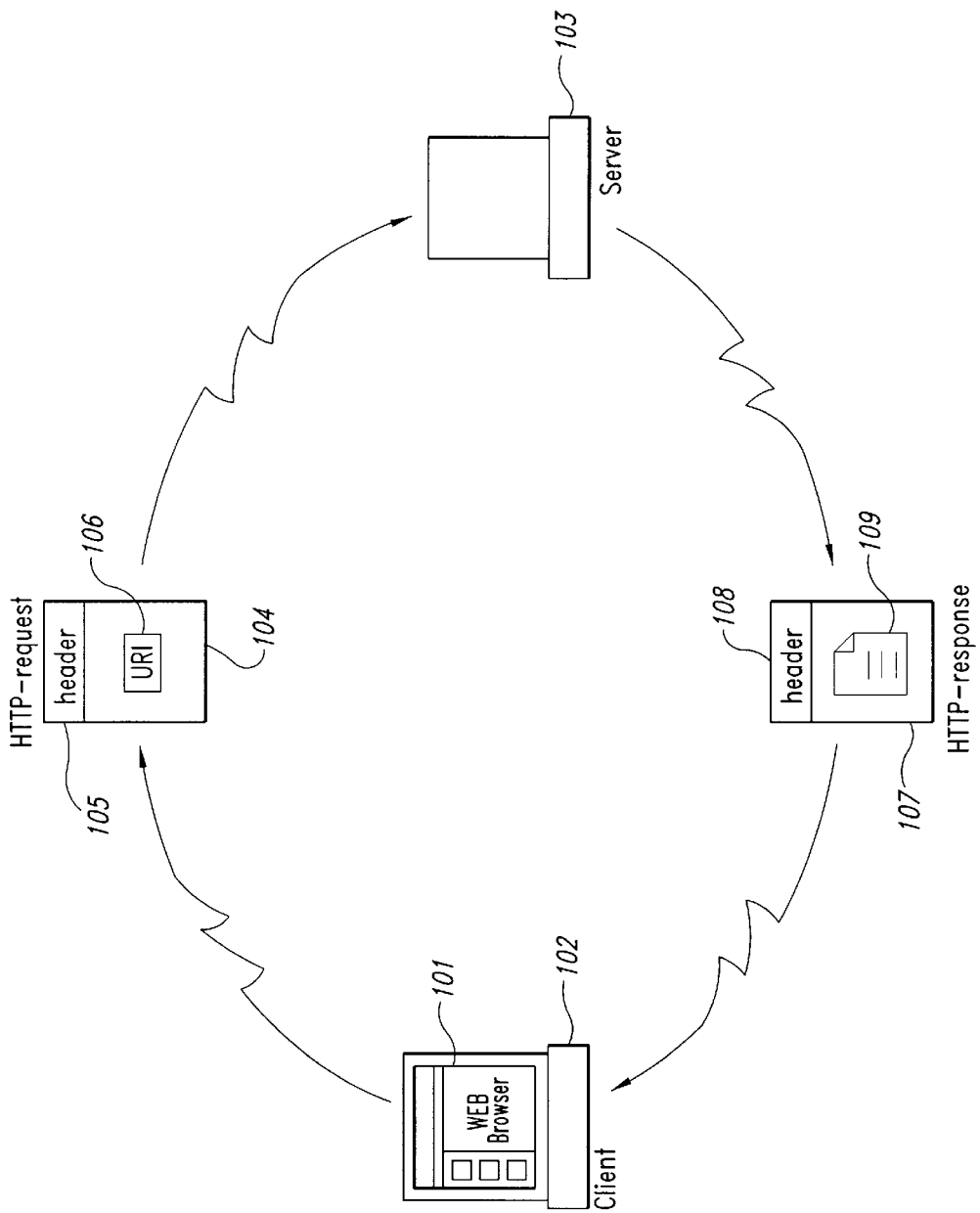
FIG. 1 illustrates how a browser application, using the client/server model of the World Wide WEB network, enables users to navigate among network nodes by requesting and receiving WEB pages.
Figure 2:
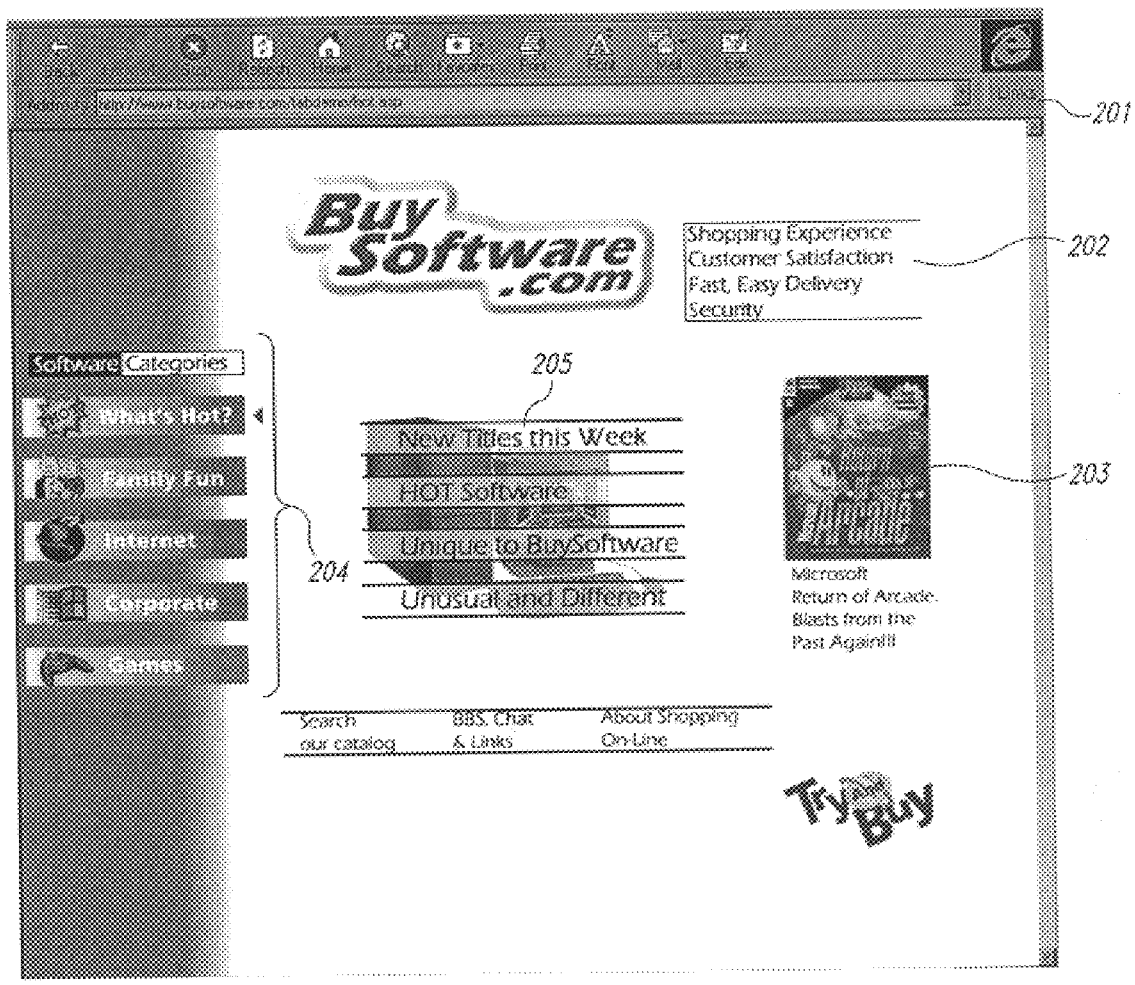
FIG. 2 is an example display screen of an online virtual store that operates with the secure digital commerce system.

FIG. 2 is an example display screen of an online virtual store that operates with the secure digital commerce system. Although the secure digital commerce system is described with reference to a virtual store, one skilled in the art will recognize that any type of electronic purchasing system or application, including a standalone application, is operable with embodiments of the present invention. A browser application window 201 is shown currently displaying (and executing) a WEB page 202 retrieved from the location specified by the URI "www.buysoftware.com." WEB page 202 provides a set of user interface elements, for example, pushbuttons 204 and 205 and icon 203 which display information or which can be used to navigate to additional information. A virtual store typically provides a set of icons, which each describe an item of merchandise that can be purchased. For example, graphical icon 203 is an example icon that is linked to the functionality needed to purchase a Microsoft Corp. software game entitled "RETURN OF ARCADE."

Each icon is typically linked to a server site on the network, which is responsible for supplying the content of the item when purchased if the item is capable of electronic delivery. When the user selects one of the icons, the browser application, as a result of processing the link, sends a request for the selected item to the server site. Thus, when a customer selects the icon 203, an HTTP request message is sent to an appropriate server site to locate and download the software modules that correspond to "RETURN OF ARCADE."

For the purposes of this specification, the merchandise that can be licensed and distributed online includes any type of digital or electronic, information or data that can be transmitted using any means for communicating and delivering such data over a network, including data transmitted by electronics, sound, laser, or other similar technique. Similarly, although the present application refers generically to "electronic data" or "electronic content," it will be understood that embodiments of the present invention can be utilized with any type of data that can be stored and transmitted over a network.

The secure digital commerce system is arranged according to a client/server architecture and provides a modularized DCS client and a modularized DCS server that interact with the online purchasing system to perform a purchase. The DCS client includes a set of client components; support for downloading the client components onto a customer computer system; and support for communicating with the DCS server to license an item of merchandise. The client components contain a secured (e.g., encrypted) copy of the content and various components needed to license and purchase the merchandise and to unsecure (e.g., decrypt) and execute the licensed merchandise. The DCS client communicates with the DCS server to download the client components onto a customer's computer system in response to a request for merchandise from the online purchasing system. The DCS client also communicates with the DCS server to license and purchase the requested merchandise. The DCS server generates an electronic license certificate, which contains license parameters (e.g., terms) that are specific to the requested merchandise and to a desired purchasing option (such as trial use, permanent purchase, or rental). The DCS server then sends the generated electronic license certificate to the DCS client. Once a valid electronic license certificate for the requested merchandise is received by the DCS client, the merchandise is made available to the customer for use in accordance with the license parameters contained in the electronic license certificate.

The DCS client includes a download file, a user interface library, a purchasing library, a secured content file, a DCS security information file, and licensing code. There is a download file for each item of merchandise that can be distributed electronically, which contains an executable boot program. The boot program is responsible for determining what components need to be downloaded for a requested item of merchandise. The secured content file contains the content that corresponds to the requested item of merchandise. The content may be a computer program, data, or a combination of both. For the purposes of this specification, "secure" or "secured" implies the use of cryptography or other types of security, including the use of hardware. One or more of the remaining components can be shared by several items of merchandise. For example, the user interface library, which defines a user interface used to purchase and license merchandise, may be specific to an item of merchandise or may be uniform for an entire online purchasing system. The purchasing library, licensing code, and DCS security information file are used to interact with the DCS server to properly license requested merchandise. In particular, the licensing code ensures that the requested merchandise is not operable by the customer until it has been properly licensed by the DCS server.

The DCS server includes a content supplier server, a licensing and purchasing broker, and a payment processing function. The content supplier server provides the merchandise-specific DCS client components. The licensing and purchasing broker generates electronic license certificates and manages purchases. The payment processing function authorizes payment for a particular transaction. One or more of each of these entities may be available in a DCS server.

One of the advantages of the modularized nature of exemplary embodiments of the present invention is that it provides a natural mechanism for replacing individual components and for customizing the system. For example, by replacing only the licensing code and a portion of the licensing and purchasing broker, an entirely new cryptographic algorithm may be used to secure the content. Embodiments of the invention also support the secure execution of requested merchandise and minimize the number of components needed to securely download, license, and execute the requested merchandise.

For the purposes of this specification, any client/server communication architecture and communication protocol that supports communication between the DCS client and the DCS server could be used.

However, in an exemplary embodiment, the secure digital commerce system utilizes the HTTP request communication model provided by the World Wide WEB network. A detailed description of this architecture and of WEB page communication is provided in J. O'Donnell et al., *Special Edition Using Microsoft Internet Explorer* 3, QUE Corp., 1996, which is incorporated herein by reference.

Figure 3:
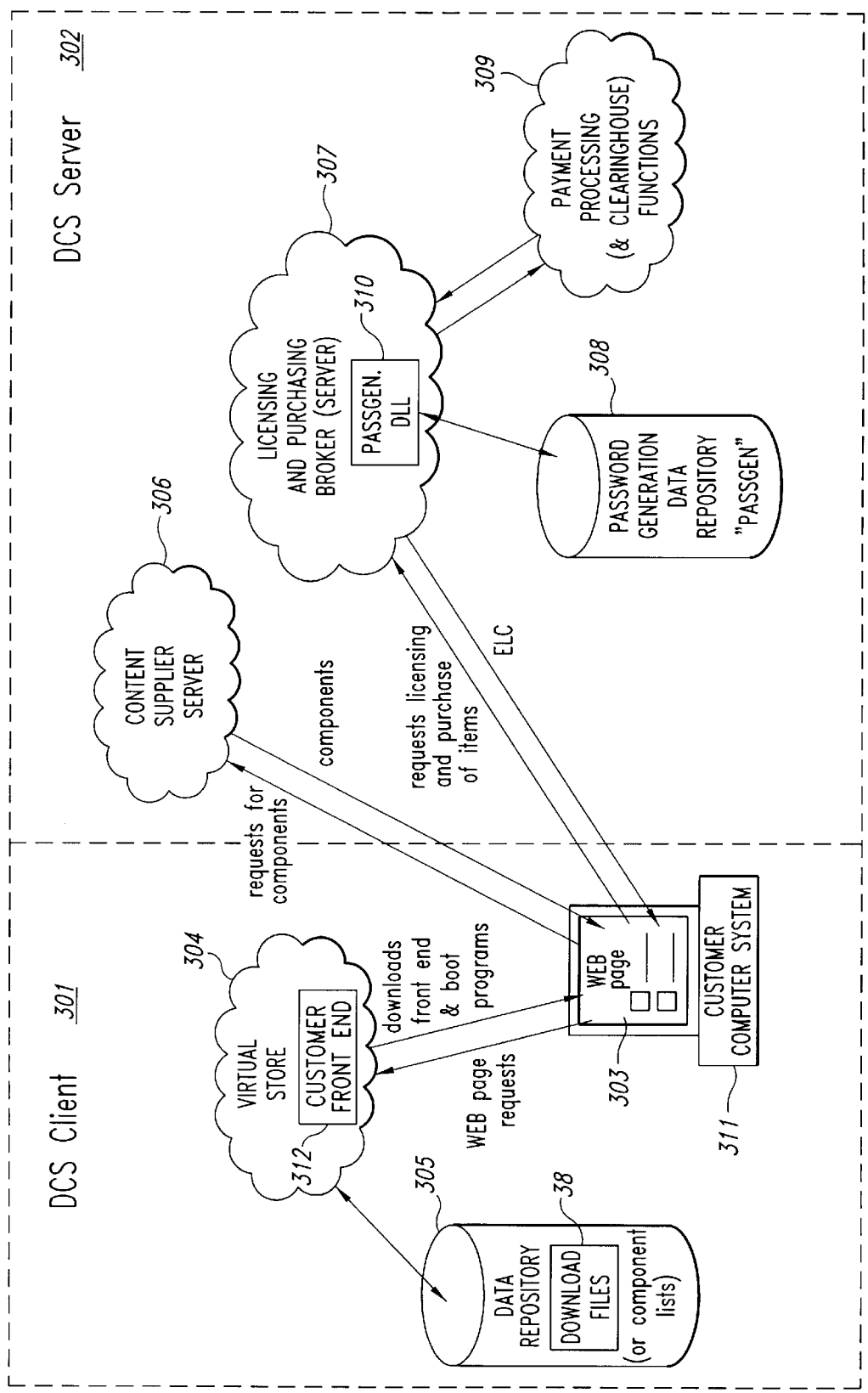
FIG. 3 is an overview block diagram of the secure digital commerce system.

FIG. 3 is an overview block diagram of the secure digital commerce system. FIG. 3 includes a DCS client 301 and a DCS server 302, which are used with an online purchasing application, such as a WEB browser application 303, to provide a purchasing interface for a potential customer. The DCS client 301 includes a virtual store 304 and a data repository 305. The virtual store 304 provides a customer front end 312 and stores in the data repository 305 merchandise-specific download files 313. The customer front end 312 includes WEB pages and associated processing support, which are downloaded onto a customer computer system 311 to enable a user to purchase merchandise. The download files 313, which each contain an executable boot program and a component list, are used to download the merchandise-specific client components (for example, a secured content file and licensing code). When an item of merchandise is requested, the associated download file is processed to extract the executable boot program and the component list. The executable boot program downloads the needed components from the content supplier server 306 using the component list, which specifies the components that are needed to successfully license and operate the corresponding item of merchandise. In an alternate embodiment, download files are generated dynamically from component lists, which lists are stored in the data repository 305.

The DCS server 302 includes a content supplier server 306, a licensing and purchasing broker (server) 307, a password generation data repository 308, and a payment processing function 309. The licensing and purchasing broker 307 includes a separate licensing library 310 (passgen.dll), which contains the code for generating an appropriate license in response to a request from the virtual store. The licensing library 310 uses the password generation data repository 308 to generate an electronic license certificate ("ELC") with licensing parameters that correspond to a particular item of merchandise. An electronic license certificate is encrypted electronic data that provides information that can be utilized to determine whether a particular customer is authorized to execute the merchandise. Such information may include, for example, the specification of a period of time that a particular customer is allowed to execute the merchandise for trial use. The data repository 308 contains tables and fields that are used to create the license parameters of a license. The data repository 308 may contain information that is supplied by the source companies of the available merchandise. The payment processing functions 309 are used by the licensing and purchasing broker 307 to charge the customer and to properly credit the appropriate supplier when the customer requests an actual purchase (rather than trial use or another form of licensing). In addition, clearinghouse functions may be invoked by the licensing and purchasing broker 307 to audit and track an online purchase. Clearinghouse functions may be as provided by well-known commercial sources, such as Litlenet and Cybersource. Similarly, payment processing functions may be provided using well-known commercial credit card authorization services.

Figure 4:
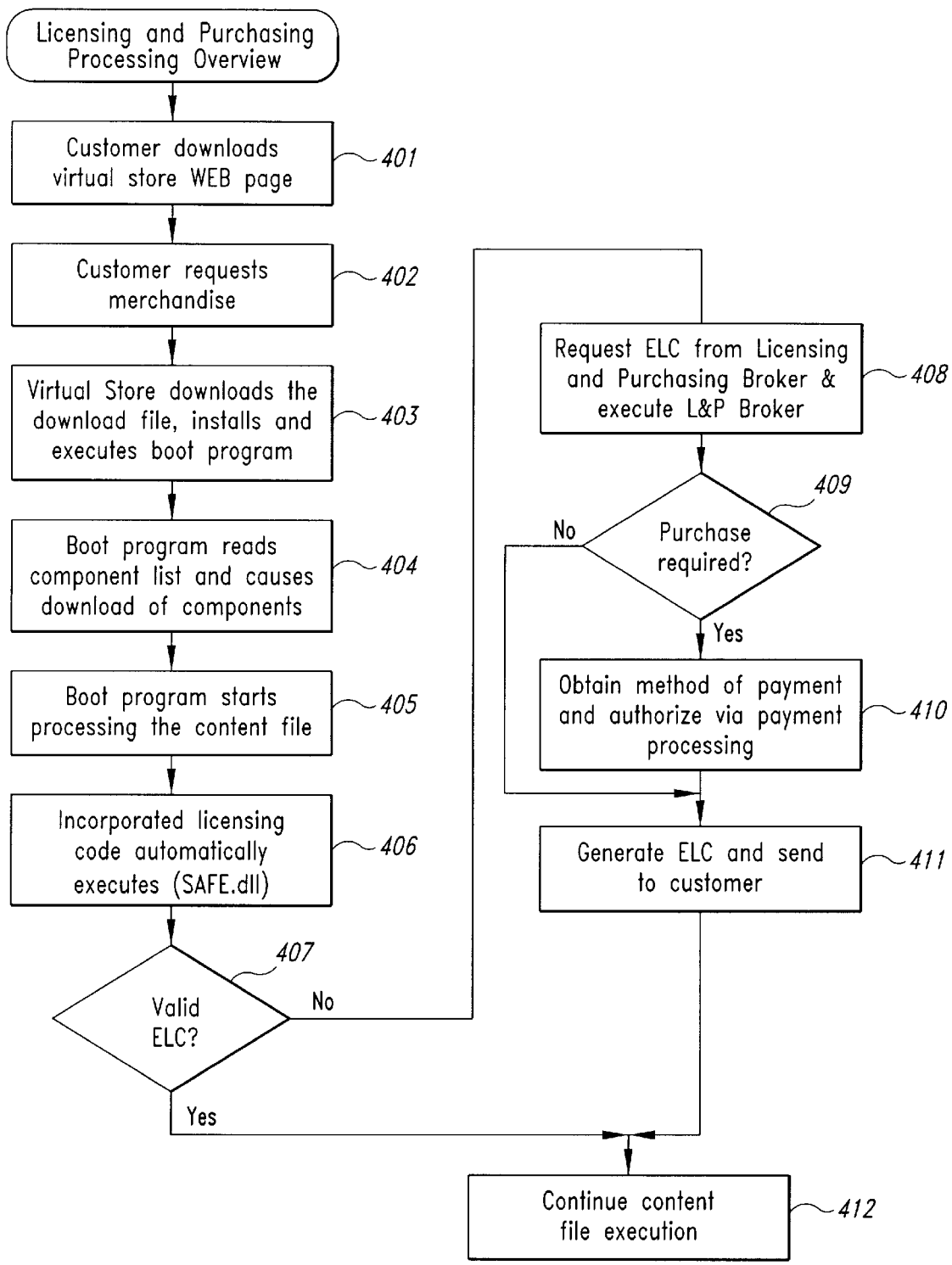
FIG. 4 is an overview flowchart of the example steps performed by the secure digital commerce system components to perform the licensing and purchase of electronic data.

FIG. 4 is an overview flowchart of the example steps performed by the secure digital commerce system components to perform the licensing and purchase of electronic data. This figure briefly describes the interactions between the components shown in FIG. 3 to accomplish the downloading, licensing, and purchasing of a requested item of merchandise when it can be delivered online. In step 401, the potential customer downloads a WEB page (part of the customer front end 312) from the virtual store 304 that includes the item to be requested (see, for example, FIG. 2). In step 402, the customer requests an item of merchandise, for example, by selecting an icon that is linked to a download file that corresponds to the desired item. In response to the selection, in step 403, the virtual store 304 downloads and installs the download file, which extracts the executable boot program and component list and causes execution (preferably as a background task) of the executable boot program on the customer computer system 311. In step 404, the boot program reads the component list to determine what DCS client components to download and requests the determined components from the appropriate contents supplier server 306. The component list, as further described below with reference to Table 2, indicates source and target locations for each component to be downloaded. In step 405, the boot program installs a downloaded (secured) content file that is associated with the desired item of merchandise and causes the content file to be processed (executed). When the content file is a computer program, then the downloaded content file has been previously configured to automatically cause licensing code to be executed before the content file is executed. When instead the content file is data to be input to a computer program, then the content player is previously configured to automatically cause the licensing code to be executed first before the content file data is processed. More specifically, the downloaded content player is installed by the boot program to process the secured (e.g., encrypted) content file data. The boot program then starts the execution of the content player, which invokes and causes execution of the downloaded licensing code. Thus, in step 406, the licensing code, which is incorporated into either the content file or the content player, is executed. In step 407, if the licensing code determines that a valid ELC already exists, then the content file continues to be processed in step 412, else the licensing code continues in step 408. In step 408, the licensing code requests a valid ELC from the licensing and purchasing broker 307. In step 409, the licensing and purchasing broker 307 determines whether a purchase is requested and, if so, continues in step 410, else continues in step 411. In step 410, the licensing and purchasing broker 307 obtains a method for payment and authorizes the payment method using the payment processing function 309. In step 411, the licensing and purchasing broker 307 generates an appropriate ELC using the licensing library 310 and the password generation data repository 308 and returns the generated EL-C to the licensing code. In step 412, if portions of the content file are encrypted as will be further described, then the content file is decrypted and processed.

As indicated above, when the downloaded (secured) content file is a computer program, licensing code is automatically invoked to verify the existence of, or obtain, a valid electronic license certificate for a requested item and to decrypt and execute the content file. One mechanism for incorporating licensing code into a content file such that it is automatically invoked is discussed in detail with reference to related U.S. patent application Ser. No. 08/792,719, entitled "Method and System for Injecting New Code Into Existing Application Code," filed on Jan. 29, 1997. That patent application describes a technique for inserting licensing code into an existing application and for inserted security code that securely executes the application code. The security code uses an incremental decryption process to ensure that a complete version of the unmodified application code is never visible at any one time (to avoid illegitimate copying). Thus the security code mechanism described therein makes it impossible for someone to create an unmodified version of the application in a reasonable amount of time. The insertion technique described therein can be used to insert into a content file the licensing code component of the DCS client, which communicates with the licensing and purchasing broker to generate an ELC. Further, the encryption/decryption technique described therein may be used in the current context to incorporate security code that securely decrypts and executes the downloaded content file.

In addition, when the content file is data to be used as input to a computer program (such as a content player), then the licensing code can be incorporated into the computer program by invoking licensing code and security code routines. For example, an application programming interface ("API") to the licensing code and to the incremental decryption security code can be provided. The content player is programmed (or configured via the insertion technique described in the related patent application) to include calls to the API routines to validate or obtain an ELC and to unsecure (e.g., decrypt) the associated content file. One skilled in the art will recognize that any mechanism that automatically causes the execution of licensing code (and security code) before the secured content is processed is operable with embodiments of the present invention.

Figure 5:
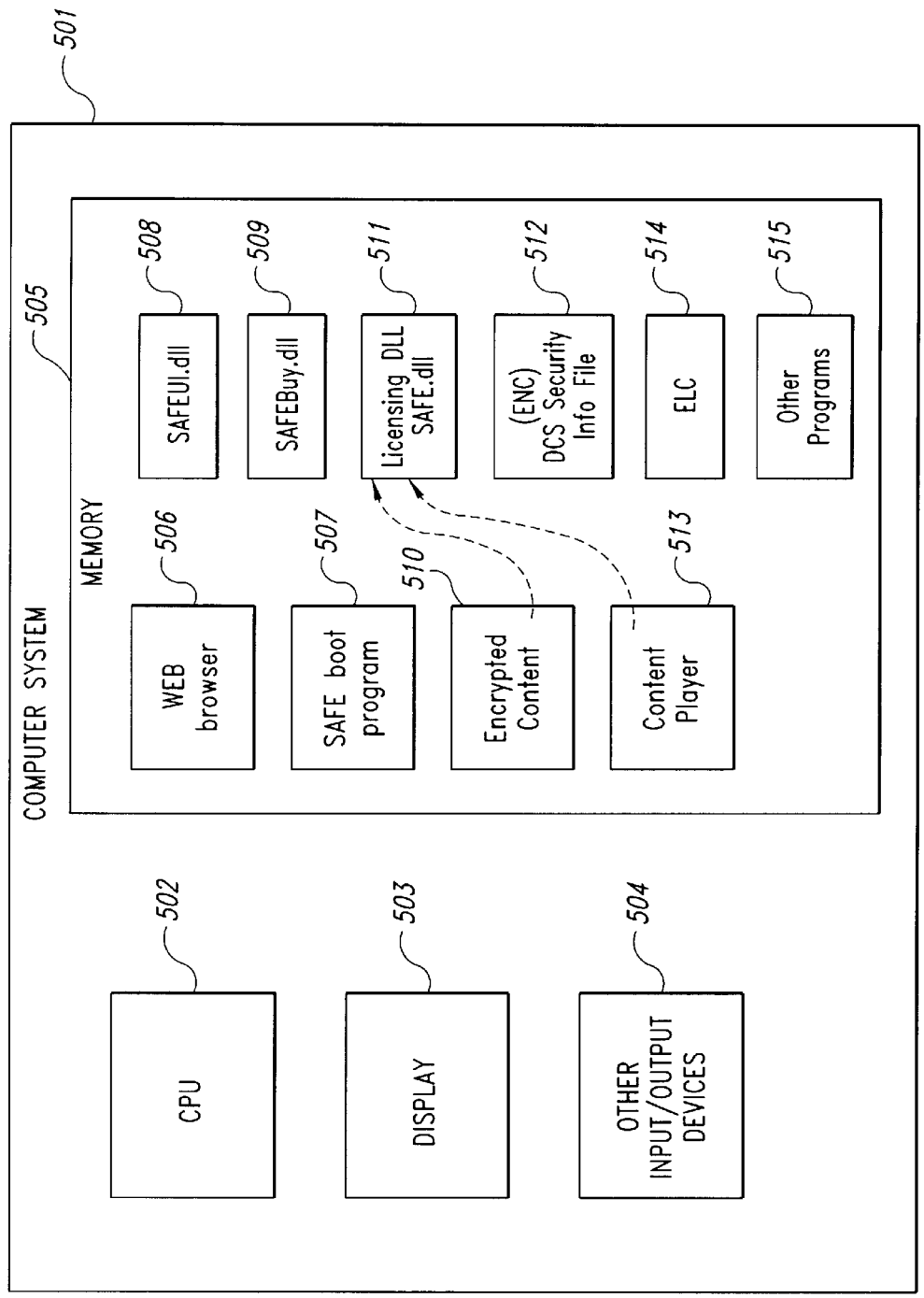
FIG. 5 is a block diagram of a general purpose computer system for practicing embodiments of the DCS client.

In exemplary embodiments, the DCS client is implemented on a computer system comprising a central processing unit, a display, a memory, and other input/output devices. Exemplary embodiments of the DCS client are designed to operate in a globally networked environment, such as a computer system that is connected to the Internet. FIG. 5 is a block diagram of a general purpose computer system for practicing embodiments of the DCS client. The computer system 501 contains a central processing unit (CPU) 502, a display 503, a computer memory (memory) 505, or other computer-readable memory medium, and other input/output devices 504. Downloaded components of the DCS client preferably reside in the memory 505 and execute on the CPU 502. The components of the DCS client are shown after they have been downloaded and installed on the computer system 501 by an executable boot program and after an appropriate electronic license certificate has been generated and installed. Specifically, the components of the DCS client include the executable boot program 507 (SAFEboot); a user interface library 508 (SAFEUI.dll); a purchasing request library 509 (SAFEBuy.dll); an encrypted content file 510, which is shown with incorporated licensing code 511 (SAFE.dll); an encrypted DCS security information file 512, which is associated with the encrypted content file 510; and an electronic licensing certificate 514 (ELC). As shown, each library is typically implemented as a dynamic link library (a "DLL"). In addition to these components, when the encrypted content file contains data that is not a computer program, the memory 505 contains a content player 513 for processing the content file 510, which has incorporated licensing code 511. Also, WEB browser application code 506 is shown residing in the memory 505. Other programs 515 also reside in the memory 505. One skilled in the art will recognize that exemplary DCS client components can also be implemented in a distributed environment where the various programs shown as currently residing in the memory 505 are instead distributed among several computer systems. For example, the encrypted content file 510 may reside on a different computer system than the boot program 507.

In exemplary embodiments, the DCS server is implemented on one or more computer systems, each comprising a central processing unit, a memory and other input/output devices. Each of these computer systems may be a general purpose computer system, similar to that described in FIG. 5, which is connected to a network. The server systems that comprise the server portion may or may not include displays. The password generation data repository may be implemented using any well-known technique for implementing a database or any other type of data repository. Although shown as a separate facility, one skilled in the art will recognize that the data repository may be incorporated as a component of the computer system that is used to implement the licensing and purchasing broker. Further, one skilled in the art will also recognize that a variety of architectures are possible and can be used to implement exemplary embodiments of the DCS server.

Figure 6:
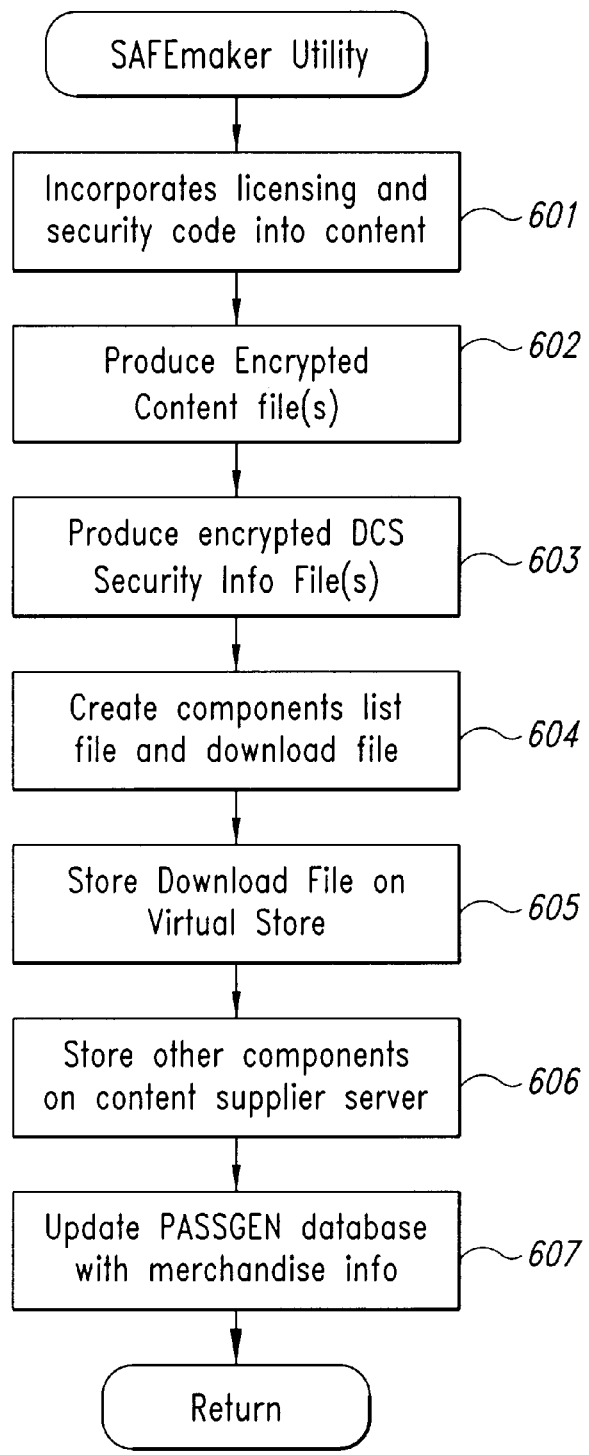
FIG. 6 is an example flow diagram of the steps performed to generate the components of the DCS client.

FIG. 6 is an example flow diagram of the steps performed to generate the components of the DCS client. In an exemplary embodiment, these steps are performed by a utility program referred to as the SAFEmaker utility. The SAFEmaker utility is responsible for generating the downloadable components that correspond to an item to be supplied as online merchandise. In addition, the utility generates a secured content file that can only be processed when access is granted. This capability is referred to as making the file "SAFE" (hence, the SAFE-prefix in the component names). Making a content file "SAFE" implies that security code and licensing code are incorporated into the content file (or content player, in the case of digital content that is not a computer program) to ensure that the online merchandise is usable only when proper licensing has been performed. Typically, this process involves encrypting some portion of the content file. Some components generated by the SAFEmaker utility are stored on the content supplier server (e.g., content supplier server 306 in FIG. 3) and are downloaded in response to requests from the virtual store front end. Other components are stored on the virtual store, which may be located on a different computer system from the content supplier server. The SAFEmaker utility also updates the password generation data repository of the DCS server with merchandise-specific information.

Specifically, in step 601, the utility incorporates licensing and security code into the supplier specific electronic content or content player. As described above, an exemplary embodiment incorporates licensing and security code according to the techniques described in the related U.S. patent application Ser. No. 08/792,719, entitled "Method and System for Injecting New Code into Existing Application Code," filed on Jan. 29, 1997 or by calling routines of an API as appropriate (e.g., when a content player is needed). One skilled in the art, however, will recognize that any technique for ensuring that proper licensing code gets executed when the content is processed and for encrypting (and subsequently decrypting) the content file will operate with embodiments of the present invention. In step 602, the utility produces one or more files that contain the (partially or fully) encrypted content. In step 603, the utility produces an encrypted DCS security information file(s), which contain information that is used, for example, to decrypt the content and to produce a proper license. The contents of an encrypted DCS security information file are described in further detail below with reference to Table 1. In step 604, the utility creates a component list file (an ".ssc" file) and a download file for this particular online merchandise. Specifically, in an embodiment that statically generates download files, a self-extracting installation file is generated (the download file), which contains the component list file (an ".ssc" file) specific to the merchandise and the executable boot program. As described above, the download file, which contains the executable boot program and the component list, is typically stored on the virtual store computer system. The executable boot program uses the component list file to determine the components to download and to download them when particular electronic content is requested. An example component list file is described further below with reference to Table 2. In step 605, the utility stores the download file on the virtual store computer system (e.g., virtual store 304 in FIG. 3). When instead the download files are dynamically generated by the virtual store when needed for a particular WEB page, then in steps 604 and 605, the utility creates and stores only the component list file. In step 606, the utility stores the other components of the DCS client, for example, the encrypted content and DCS security information files, the licensing code, and the user interface library on the content supplier server system (e.g., content supplier server 306 in FIG. 3). In step 607, the utility updates the password generation data repository (e.g., password generation database 308 in FIG. 3) with the merchandise-specific licensing information, for example, the fields used to generate the license parameters of a valid electronic license certificate, and then returns. An example password generation data repository is discussed in further detail with reference to Tables 3, 4, and 5. One skilled in the art will recognize that the generation of these components and the password generation data may be performed at different times and by separate utilities.

TABLE 1

| Field Name: | Type: |
|---|---|
| CommerceServer | String |
| ProductSkuId | String |
| ProductUUID | String |
| UILibName | String |

TABLE 1-continued

| Field Name: | Type: |
| --- | --- |
| EntryPoint | Integer |
| ImageBase | Integer |
| Ekey | String |
| Ecode | BinaryObject |
| DataSize | Integer |
| NumberRelocations | Integer |
| Relocations | String |
| ContactCompany | String |
| ContactAddress | String |
| ContactSupportPhone | String |
| ContactSupportFax | String |
| ContactSupportEmail | String |
| ContactOrderPhone | String |
| ContactOrderFax | String |
| ContactOrderEmail | String |
| ProductName | String |
| LicenseFilename | String |
| LicenseAdminDir | String |
| DeveloperId | String |
| SecretKey | BinaryObject |
| ActiveAssistants | Integer |
| FeatureName | String |
| FeatureNumber | Integer |
| HostIdTypeList | String |
| IntegrationType | Integer |

Table 1 is an example list of fields that may be included in an encrypted DCS security information file. For each encrypted content file (or set of files), the supplier provides fields that are used by a virtual store to download, license, and purchase the associated electronic content. The data in the encrypted DCS security information file is encrypted separately from the content file to enable multiple items of merchandise to share purchasing, licensing, and decryption information. This capability is especially useful when the items are provided by the same content supplier server. Thus, a single encrypted DCS security information file may be associated with more than one encrypted content file. In addition, each field in the DCS security information file is encrypted separately. By separately encrypting each field, purchasing or licensing information can be changed without having to re-encrypt the content file or the rest of the DCS security information file.

Specifically, in Table 1 the CommerceServer field indicates the location of the licensing and purchasing broker (e.g., the network address of licensing and purchasing broker 307 in FIG. 3) to be used to license and purchase the merchandise. (In embodiments of the secure digital commerce system, one or more content suppliers, licensing and purchasing brokers, or payment processing functions, may be utilized.) The ProductSKUId field is a specific identifier associated with a version (each executable) of a product for a specific reseller (virtual store). For the purposes of example, exemplary embodiments assume that a product may have multiple versions and that each version may be packaged differently depending upon the purchasing option (for example, trial use versus full purchase). In addition, more than one reseller may offer a version of a product. The ProductSKUId field is used to identify a password configuration table to be used to generate an electronic license certificate and is discussed further below. The ProductUUID field is a specific identifier associated with each version of a product regardless of the reseller. By using an identifier that is specific to the product version and not to the reseller, the digital commerce system can ensure that a customer who licenses a version of a product for (one time) trial use may not utilize multiple resellers to obtain more than one ELC for the same version. In addition, this identifier is used by the licensing code to locate the associated DCS security information file and is associated with various licensing-specific information. For example, clock data can be stored in a system registry indexed by ProductUUID to ensure that "time-bomb" protected content is not defeated by resetting the clock to illegitimately process the content. The UILibName indicates the location of a user interface library to be used for purchasing the merchandise. The EntryPoint, ImageBase, EKey, ECode, DataSize, NumberRelocations, and Relocations fields are used to support the decryption of the encrypted content file(s) and to determine the relocation information when the content file is secured using the technology of related U.S. patent application Ser. No. 08/792,719. If an alternative licensing and encryption scheme is used, then these fields would be modified accordingly. The ContactCompany, ContactAddress, ContactSupportPhone, ContactSupportFax, ContactSupportEmail, ContactOrderPhone, ContactOrderFax, and ContactOrderEmail fields reflect supplier dependent information that can be displayed in dialogs presented by the virtual store depending on the user interface being employed. The DeveloperID and SecretKey fields are used to create a symmetric key to decode the electronic license certificate generated by the licensing and purchasing broker. The other fields are used for other similar licensing and purchasing functions.

TABLE 2

| | | |
| --- | --- | --- |
| <Execute | | |
| TRIGGER | = | "<ProgramFilesDir>\winzip\winzip32.exe" |
| URI | = | "http://devserver/products/winzip32/winzipsetup.exe" |
| MSGDIG | = | "NDLsrKcS36YbugITP4yUjv8PSfk=" |
| ProductUUID | = | "WINZIP-demo-0000" |
| NAME | = | "WinZip 6.2" |
| DESCRIPTION | = | "WinZip 6.2" |
| LOCAL | = | "<ProgramFilesDir>\winzip\setup.exe"> |

Table 2 is an example of the contents of a single entry in a component list file. In an exemplary embodiment, each icon in the virtual store that corresponds to an item that can be purchased and distributed online is associated with a component list file (an .ssc file). Within each component list file there is an entry similar to that shown in Table 2 for each component that is to be downloaded when the associated item is requested. For example, if there is an item-specific encrypted DCS security information file and an item-specific user interface library that are to be downloaded to purchase the requested item, then there are entries for each such component.

Each entry contains a tag that specifies how to process the component when it is downloaded and sufficient information to download a component if the file indicated by the TRIGGER field is not already present on the customer computer system. Specifically, the tag (in this example "Execute") specifies what to do with the component referred to by the LOCAL field once it is downloaded. An "Execute" tag specifies that the component referred to by the LOCAL field (e.g., "setup.exe") will always be executed. A "Component" tag specifies that the component referred to by the LOCAL field is to be downloaded with no further processing. An "ExecuteOnce" tag specifies that the component referred to by the LOCAL field is to be executed only if the file referred to by the TRIGGER field does not already exist. The TRIGGER field of each entry indicates the location of a file that is present when the component does not need to be downloaded. Thus, the TRIGGER field is used to determine whether to download a component. The URI field indicates the location of a content supplier server that can provide the component. In addition, the MSGDIG field contains a message digest, which is used to determine whether the component has been successfully loaded. Use of the message digest is described in further detail below with respect to FIG. 8. The ProductUUID, NAME, and DESCRIPTION fields indicate identifying information used by the licensing code. When present, these fields are typically stored in a system registry and used by the licensing code to determine which DCS security information file to use for a particular content file. In addition, the NAME field may be displayed by the boot program executable to give user feedback regarding the component currently being downloaded. The LOCAL field indicates a target location for the downloaded component on the customer computer system.

Figure 7:
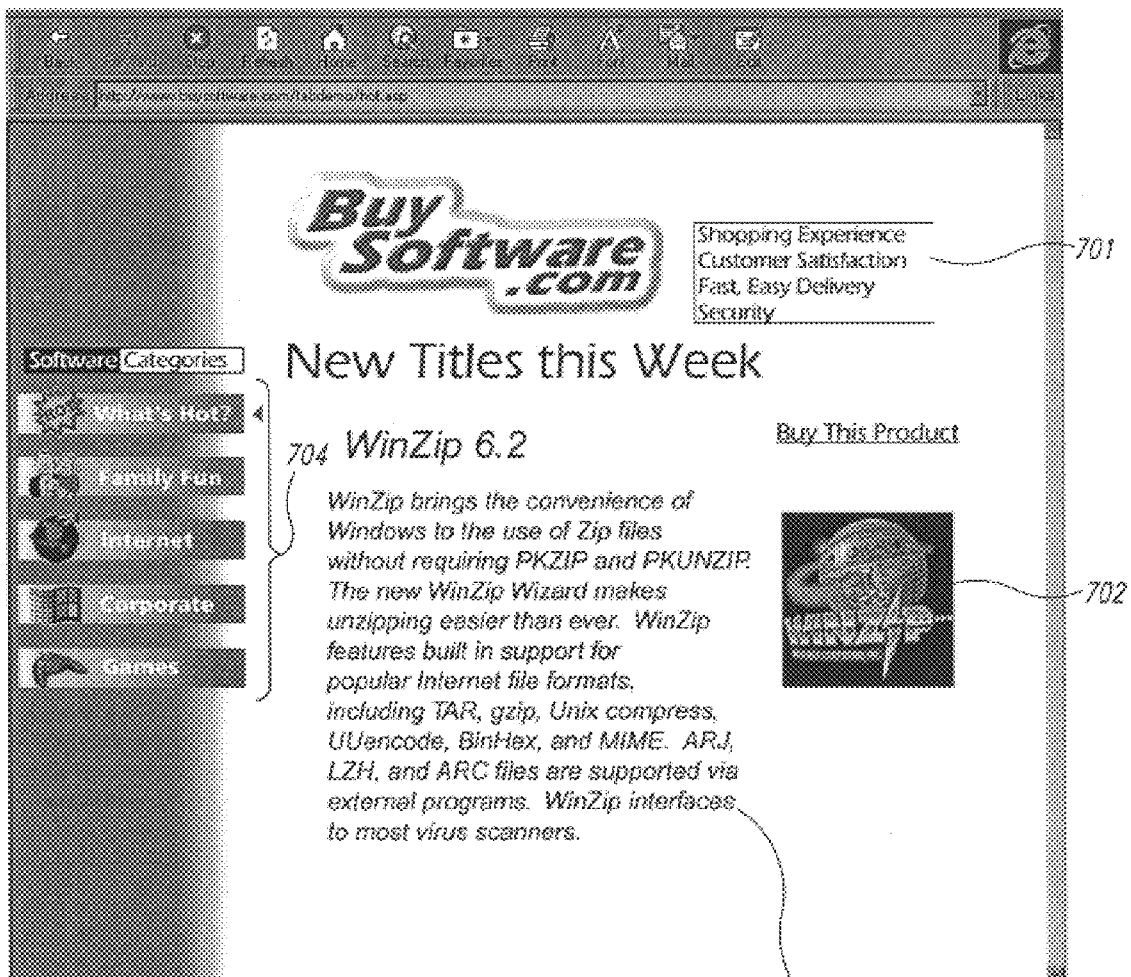
FIG. 7 is an example WEB page of a virtual store used to purchase electronic data, which is executing on a customer computer system.

FIGS. 7–13 describe in further detail the steps performed by the secure digital commerce system to perform the licensing and purchasing process presented in FIG. 4. One skilled in the art will recognize that these steps can be performed in other orders and by different components than those presented herein. As a preliminary matter, the customer first navigates to a virtual store WEB page in order to request an item for purchase. FIG. 7 is an example WEB page of a virtual store used to purchase electronic data, which is executing on a customer computer system. (Display of this WEB page corresponds to step 401 in FIG. 4.) WEB page 701 contains an icon 702, which, when selected, causes the "WinZip 6.2" product to be licensed and optionally purchased. Text area 703 contains descriptive text to aid a customer in making a decision to license or buy the WinZip 6.2 product. Pushbuttons 704 enable the user to explore other merchandise available for license and purchasing.

When the customer requests an item of merchandise to be licensed or purchased (for example, when the user selects icon 702 in FIG. 7), then the virtual store downloads and potentially initiates the execution of a boot program associated with the requested merchandise (see step 403 in FIG. 4). Specifically, each merchandise icon is linked (anchored) to a merchandise-specific download file, which is a file stored on (or generated by) the virtual store. In one embodiment, the download file is a self-extracting file that contains: extraction code, a header that indicates the size of the boot program which follows, the boot program (preferably compressed), and the appropriate component list file. The download file can be generated statically using the SAFEmaker utility described above or can be generated dynamically by the virtual store when it downloads a WEB page that includes the icon that is anchored to the download file. When the customer selects a merchandise icon, the customer is queried whether to download and store or download and execute the anchor file (indicated by the link). When the user indicates that the download file is to be executed, the extraction code of the download file is executed, which causes the component list (the ".ssc" file) to be extracted and the boot program executable to be (potentially decompressed,) extracted and executed. One skilled in the art will recognize that any mechanism for associating an icon with a boot program and for causing the boot program to be downloaded and executed is operable with the secure digital commerce system.

Figure 8:
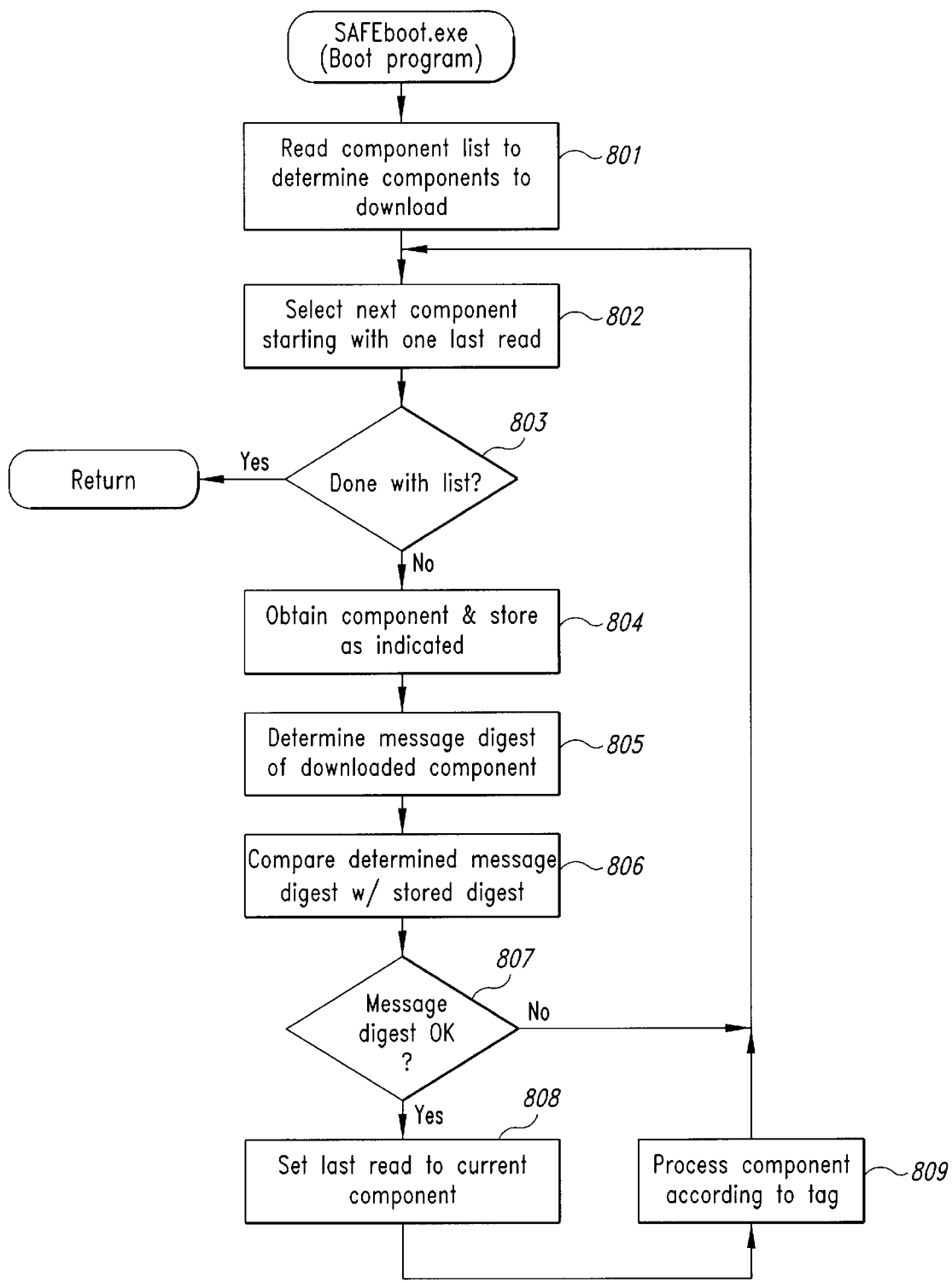
FIG. 8 is an example flow diagram of the steps performed by a boot program executed on a customer computer system to download client components when licensing a selected item of merchandise.

FIG. 8 is an example flow diagram of the steps performed by a boot program executed on a customer computer system to download client components when licensing a selected item of merchandise. (These steps correspond to steps 404–405 in FIG. 4.) The boot program is implemented such that it downloads only the components that are necessary to license (and optionally purchase) the selected item. For example, if the user interface library to be used to purchase the selected item is the same library as one already downloaded, then it is not downloaded again. In addition, the boot program can recover from a failure during the load process and can resume downloading where it left off. The boot program accomplishes these objectives by using a message digest algorithm to determine whether a component has been successfully downloaded onto a customer computer system.

Specifically, in step 801, the boot program reads the component list (the ".ssc" file) associated with the selected item of merchandise to determine what components to download from a specified content supplier server. In steps 802–808, the boot program executes a loop to process each remaining component in the component list that has not already been successfully downloaded. Specifically, in step 802, the boot program selects the next component from the component list that appears following the last successfully read component. In step 803, the boot program determines whether all of the remaining components of the list have been processed, and if so, returns, else continues in step 804. In step 804, the boot program determines whether the file indicated by the TRIGGER field is already present. If not, the boot program obtains the component indicated by the URI value from the content supplier server and stores the obtained component as indicated by the LOCAL value (see Table 2). In step 805, the boot program calculates a message digest (the value of a one-way hash function) for the downloaded component. In step 806, the determined message digest for the newly downloaded component is compared with a previously stored message digest in the component list (see the MSGDIG value in Table 2). In an exemplary embodiment, an MD5 algorithm is used to calculate a message digest. However, one skilled in the art will recognize that any message digest algorithm or any function capable of determining a predictable value for the downloaded component for comparison to an already stored value may be used. The MD4 and MD5 algorithms are described in Bruce Schneier, *Applied Cryptography*, John Wiley & Sons, Inc., 1994, which is hereby incorporated by reference. In step 807, if the calculated message digest is identical to the stored message digest, then the boot program continues in step 808, else continues back to the beginning of the loop in step 802, because a failure has occurred in downloading the component. In step 808, the boot program sets an indicator of the last successfully read component to indicate the component most recently loaded. In step 809, the boot program processes the component according to the tag (e.g., "Execute"), and continues back to step 802 to select the next component to download. Note that the tag associated with each component entry will automatically cause the secured content file (or the content player, depending on the situation) to begin executing.

One skilled in the art will recognize that different behaviors will occur when the content file (or content player) begins executing depending upon the technique used to incorporate the licensing code and decryption (security) code and depending upon the encryption/decryption technique used. For example, as described in further detail in related U.S. patent application Ser. No. 08/792,719, when using the injection techniques described therein, the execution of the encrypted content file will automatically cause the licensing code and (eventually) the security code to be executed as a result of injecting a licensing DLL into the content file. Specifically, a "DLLMain" routine is automatically invoked when the licensing code library is loaded, which in turn executes the actual licensing code. After the licensing code executes, the security code stored in the encrypted content automatically executes because it is inserted into the content file immediately following (a reference to) the licensing code. Thus, the licensing code and the decryption code are automatically executed before any supplier-specific content is executed. The security code in an exemplary embodiment decrypts the encrypted content incrementally in order to prevent a fully decrypted version of the content to be present in its entirety at any one time. A similar procedure is used when the content player invokes the licensing and security code with an exception that the licensing and security code is explicitly invoked and knows how to locate the content file and to decrypt it incrementally.

Figure 9:
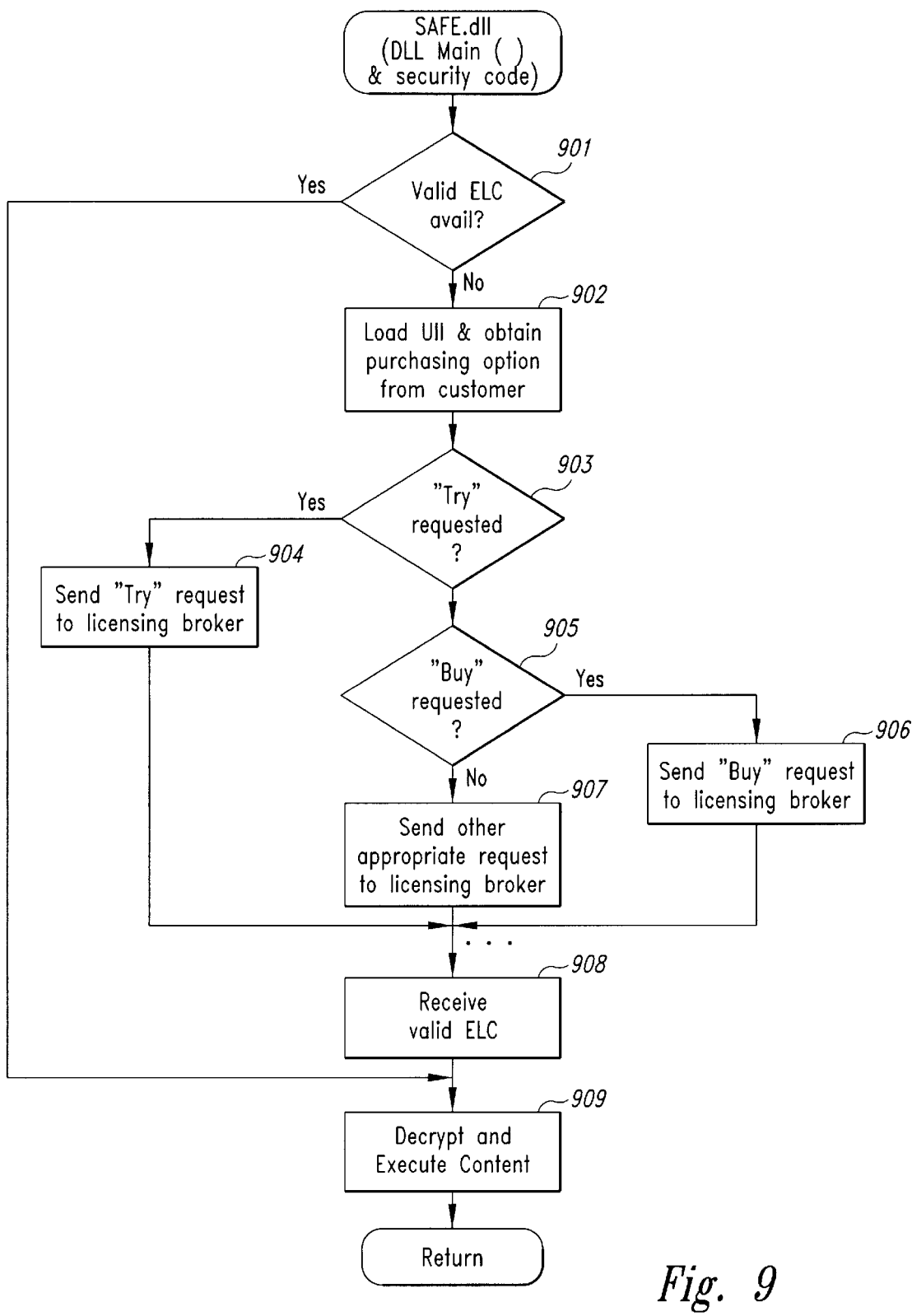
FIG. 9 is an example flow diagram of licensing code that has been incorporated into an encrypted content file.

FIG. 9 is an example flow diagram of licensing code that has been incorporated into an encrypted content file. Similar code is incorporated in a content player by calling appropriate routines. The licensing code will be discussed for purposes of example relative to an encrypted content file. In one exemplary embodiment, the licensing code is provided in a dynamic link library, such as SAFE.dll 511 in FIG. 5. (The steps of FIG. 9 correspond to steps 406–408 and 412 in FIG. 4.) Each time the encrypted content file is executed by the customer computer system, the licensing code is preferably automatically executed. The licensing code is responsible for determining whether a valid electronic license certificate is available and, if so, allowing execution of the content, otherwise forcing the customer to license the item from the supplier.

Specifically, in step 901, the licensing code determines whether a valid electronic license certificate ("ELC") is available. The steps used to make this determination are discussed further below with reference to FIG. 11. If a valid ELC is available, then the licensing code continues in step 909 and skips the licensing and purchasing process, else continues in step 902. In step 902, the licensing code loads the user interface library associated with the component and obtains a purchase option from the customer, such as "rent-to-buy," "buy," or "try." The purchase options assist in determining the parameters of a valid license. An example interface for obtaining this information is described below with reference to FIG. 10. The licensing code obtains the user interface library name by retrieving the UILibName field from the DCS security information file associated with the product. The associated DCS security information file can be determined from the ProductUUID, which was previously stored in the system registry by the boot program during the component download process. In step 903, the licensing code determines whether the customer has indicated that a trial purchasing option is requested and, if so, continues in step 904, else continues in step 905. In step 904, the licensing code sends an HTTP request message to the licensing and purchasing broker (e.g., the licensing and purchasing broker 307 in FIG. 3) to provide an appropriate license for trial use of the product, and continues in step 908. In step 905, the licensing code determines whether the customer has indicated a purchasing option to purchase the content and, if so, continues in step 906, else continues in step 907. In step 906, the licensing code sends an HTTP request message to the licensing and purchasing broker to purchase the content, and continues in step 908. In step 907, the licensing code determines whether any other type of licensing or purchasing request has been indicated by the customer and sends an appropriate HTTP request message to the licensing and purchasing broker. For example, other requests associated with rental use or other types of purchasing options may be supported. The processing of these HTTP request messages by the licensing and purchasing broker is discussed further below with respect to FIG. 12. In step 908, the licensing code receives a valid ELC from the licensing and purchasing broker, stores it, and continues in step 909. The ELC may be stored in any area that is accessible to processes executing on the customer computer system, such as in a system registry. In step 909, the licensing code causes the decryption and execution of the licensed content, and returns.

In an exemplary embodiment, the licensing code uses an intermediary library function (stored in, for example, the SAFEBuy.dll 509 in FIG. 5) to send the purchasing request of step 906 to the licensing and purchasing broker. A separate library is useful in scenarios where other types of programs (other than virtual stores) desire to utilize the purchasing capabilities of the licensing and purchasing broker. The library function provides a unique transaction identifier that can be used to identify the particular purchase transaction at a further time. Such capability is useful, for example, to later cancel the purchase. One skilled in the art will recognize that other organizations of the licensing and purchasing support code are also possible.

Figure 10:
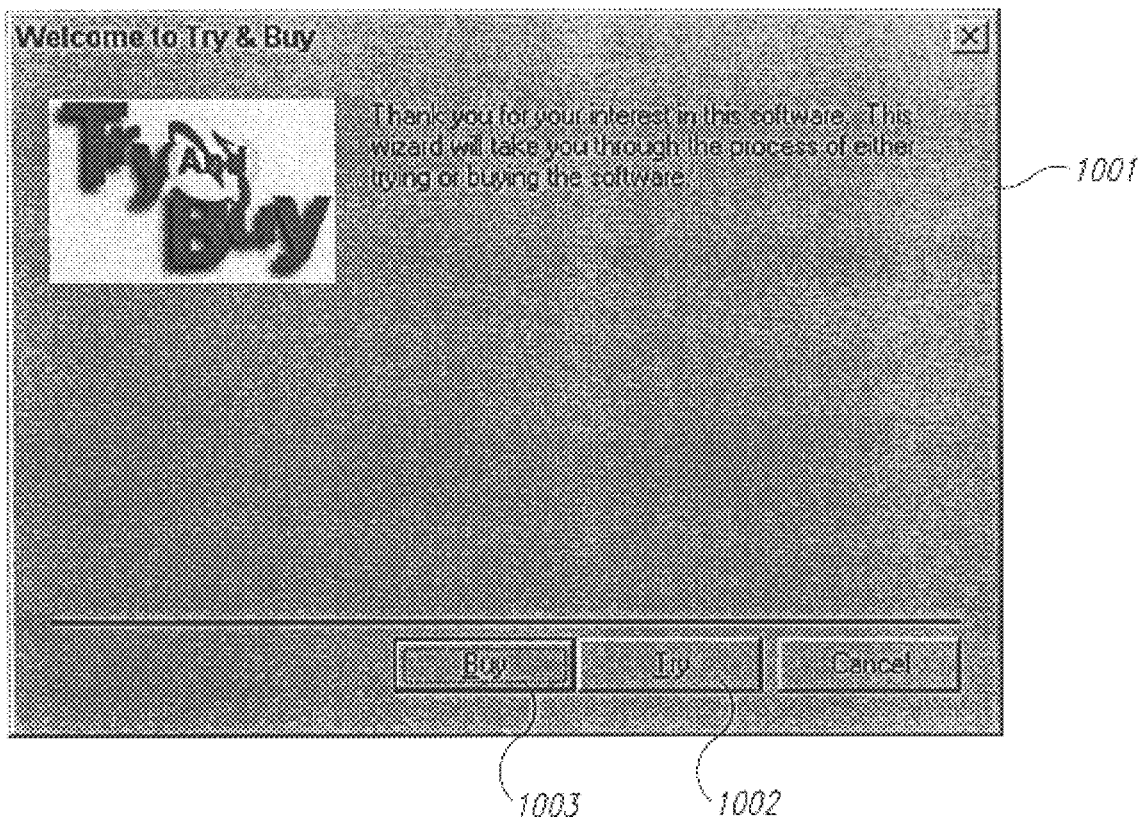
FIG. 10 is an example display screen presented by a virtual store to determine whether a customer desires to license a product for trial use or for purchase.

FIG. 10 is an example display screen presented by a virtual store to determine whether a customer desires to license a product for trial use or for purchase. This display screen 1001 may be used to implement step 902 in FIG. 9. When the customer selects the "Try" pushbutton 1002 in FIG. 10, then the customer has indicated that trial use of the product is desired. Alternatively, when the customer selects the "Buy" pushbutton 1003 in FIG. 10, then the customer has indicated the desire to purchase the product.

Figure 11:
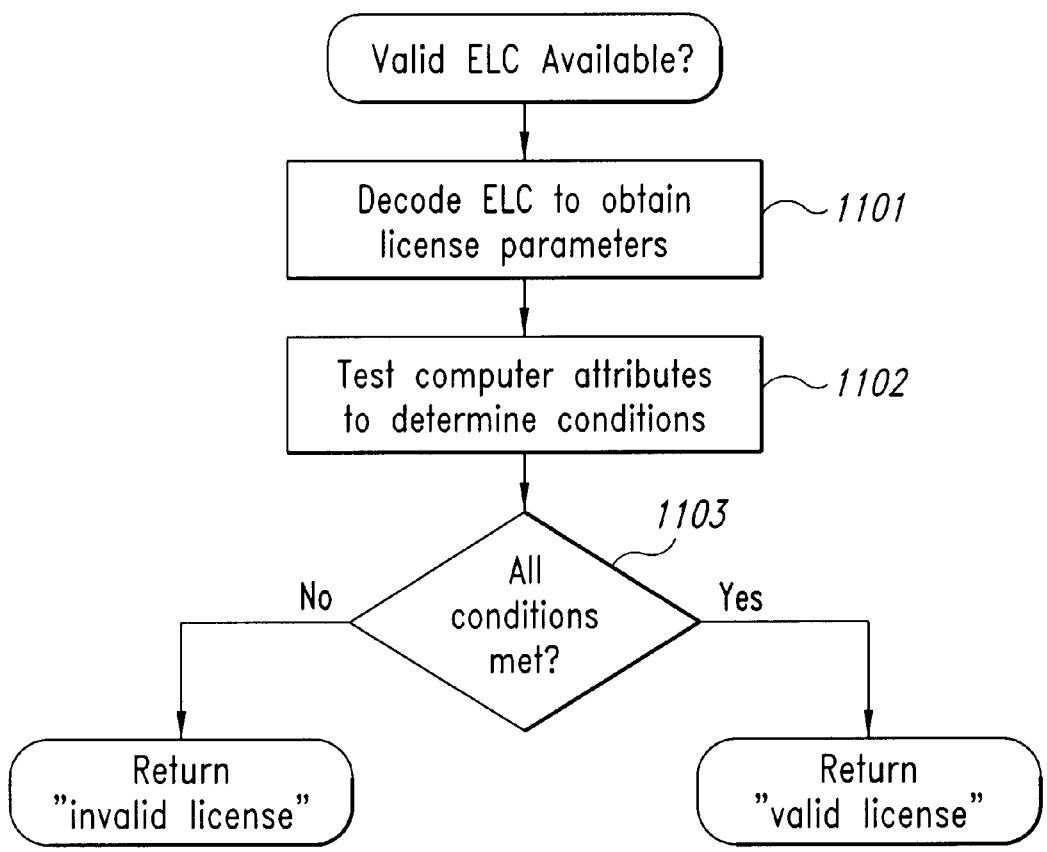
FIG. 11 is an example flow diagram of the steps performed by licensing code to determine whether a valid electronic licensing certificate is available.

FIG. 11 is an example flow diagram of the steps performed by licensing code to determine whether a valid electronic licensing certificate is available. In step 1101, the code retrieves, decrypts, and decodes the electronic licensing certificate (ELC) to obtain the parameters of the license (e.g., the license terms). The license parameters that are obtained in step 1101 indicate, for example, how many uses of a particular license can be executed or, for example, how many different user passwords are able to use the same electronic license. In addition, license parameters that reflect an authorized time period for use may be specified. In step 1102, the code tests various attributes of the customer computer system to determine whether the conditions indicated by the retrieved license parameters have been met. In step 1103, if all of the conditions have been met (for example, the license use period has not expired), then the code returns indicating that a valid license is in effect. Otherwise, the code returns indicating that the current license is invalid.

In an exemplary embodiment, the ELC is encrypted and decrypted using a symmetric key algorithm. A symmetric algorithm implies that the same key is used to encrypt a plaintext message and to decrypt a ciphertext message. Any symmetric key algorithm could be used. Symmetric and public key cryptography, both of which are utilized by exemplary embodiments of the present invention, are described in detail in Bruce Schneier, *Applied Cryptography*, John Wiley & Sons, Inc., 1994, which is herein incorporated by reference. According to one technique, the DeveloperID and SecretKey fields (stored in the encrypted information file) are used to formulate a symmetric key, which is client and product specific. These fields are provided by the supplier when the SAFEmaker utility is executed to produce the components of the DCS client (see FIG. 6). Because the encryption of the ELC is provided by the licensing and purchasing broker and the corresponding decryption of the ELC is provided by the licensing code, the encryption and decryption code are preferably synchronized to correspond to one another. For this reason, a separate dynamic link library (e.g., passgen.dll) is used by the licensing and purchasing broker to allow the encryption algorithm to be replaced at any time to correspond to different licensing code.

Figure 12:
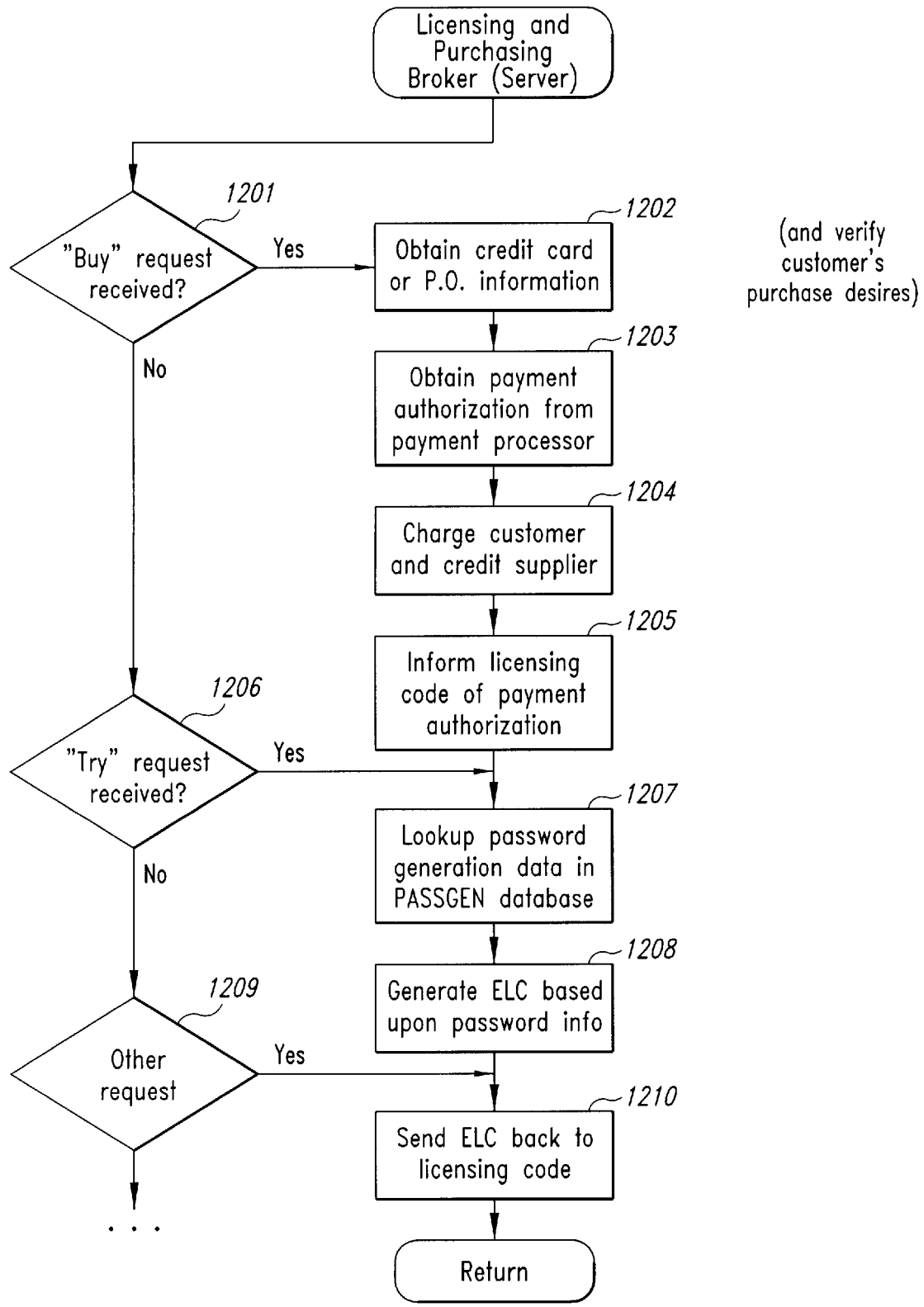
FIG. 12 is an example flow diagram of the steps performed by a licensing and purchasing broker of the secure digital commerce system.

FIG. 12 is an example flow diagram of the steps performed by a licensing and purchasing broker of the secure digital commerce system. These steps are executed in response to receiving an HTTP request message sent by the licensing code in step 904 or 906 in FIG. 9. As described earlier, the licensing and purchasing broker interacts with a password generation system (e.g., passgen.dll and the data repository) and payment processing functions to license and purchase an indicated item of merchandise. In summary, when the licensing and purchasing broker receives a request to buy an item, it performs appropriate payment processing to perform a purchase. When the licensing and purchasing broker receives either a request to try or a request to buy the item, the broker uses the password generation system to generate an ELC to return to the licensing code.

Specifically, in step 1201, the broker determines whether a buy request has been received and, if so, continues in step 1202, else continues in step 1206. In step 1202, the broker causes the licensing code (specifically, the user interface library routines) executing on the customer computer system to obtain credit card or purchase order information if such information was not already sent with the request. A sample user interface for obtaining method of payment information and for verifying the purchase transaction are described below with reference to FIGS. 14–17. Once the credit card or purchase order information has been obtained by the licensing and purchasing broker, then in step 1203 the broker obtains payment authorization from a payment processor such as the payment processing function 309 in FIG. 3 and informs the licensing code accordingly. One skilled in the art will recognize that any mechanism for is authorizing use of a credit card could be used. In step 1204, the customer's credit card account is charged, and the supplier system is automatically credited. One skilled in the art will recognize that the licensing and purchasing broker can either credit the supplier directly at this time by sending the appropriate information to the credit card company, or can have the credit card company pay the licensing and purchasing broker, which in turn is responsible for payment to the supplier. In step 1205, the broker informs the licensing code of payment authorization and continues in step 1207. An example user interface for reporting the transaction identification information to the customer is described below with reference to FIG. 18. If payment has not been authorized, then the broker returns such information to the licensing code, discontinues execution of the steps in FIG. 12, and fails to generate a valid ELC.

In step 1206, the broker determines whether it has received an HTTP request message that indicates trial use is desired and, if so, continues in step 1207, else continues in step 1209. In step 1207, in order for the broker to generate an ELC specific to the user and to the indicated product, certain information is typically sent by the licensing code in the HTTP request message. Specifically, information that uniquely identifies the user and the product version is provided. The broker uses the received product version identifier (the ProductSKUld) to retrieve from a version table a corresponding password configuration identifier (pass-config-id). Once the pass-config-id is retrieved from the version password generation data repository table, this identifier is used as an index into a password configuration table to determine a set of fields to be used to generate the license parameters of the ELC. (One will recall that the fields stored in the password generation tables were specified by the supplier of the content in conjunction with the SAFEmaker utility.) An example password configuration table is shown below as Table 3. A table with potentially different fields exists for each unique pass-config-id. Because multiple versions of products and multiple products may use the same pass-config-id, they may share a single password configuration table. This attribute may be useful, for example, if all the products from a particular supplier have similar electronic licensing capabilities. In step 1208, an ELC is generated based upon the fields of the determined password configuration table using a symmetric key formulated from the SecretKey and DeveloperID fields of the encrypted information file and an appropriate encryption algorithm, as discussed earlier. For the purposes of this specification, the ELC may be viewed as a very long number which encrypts the license parameters indicated by the fields in the password configuration table. In an exemplary embodiment, the code used to perform steps 1207–1208 is provided in a separate code module (e.g., passgen.dll) so that the password generation code, including the encryption and decryption algorithms, can be easily replaced in a licensing and purchasing broker.

In step 1209, the broker processes any other type of purchasing option, for example, a renting option, and generates an appropriate ELC in a similar fashion to steps 1207–1209. In step 1210, the broker sends the generated ELC back to the licensing code executing on the customer computer system, and then returns.

Figure 13:
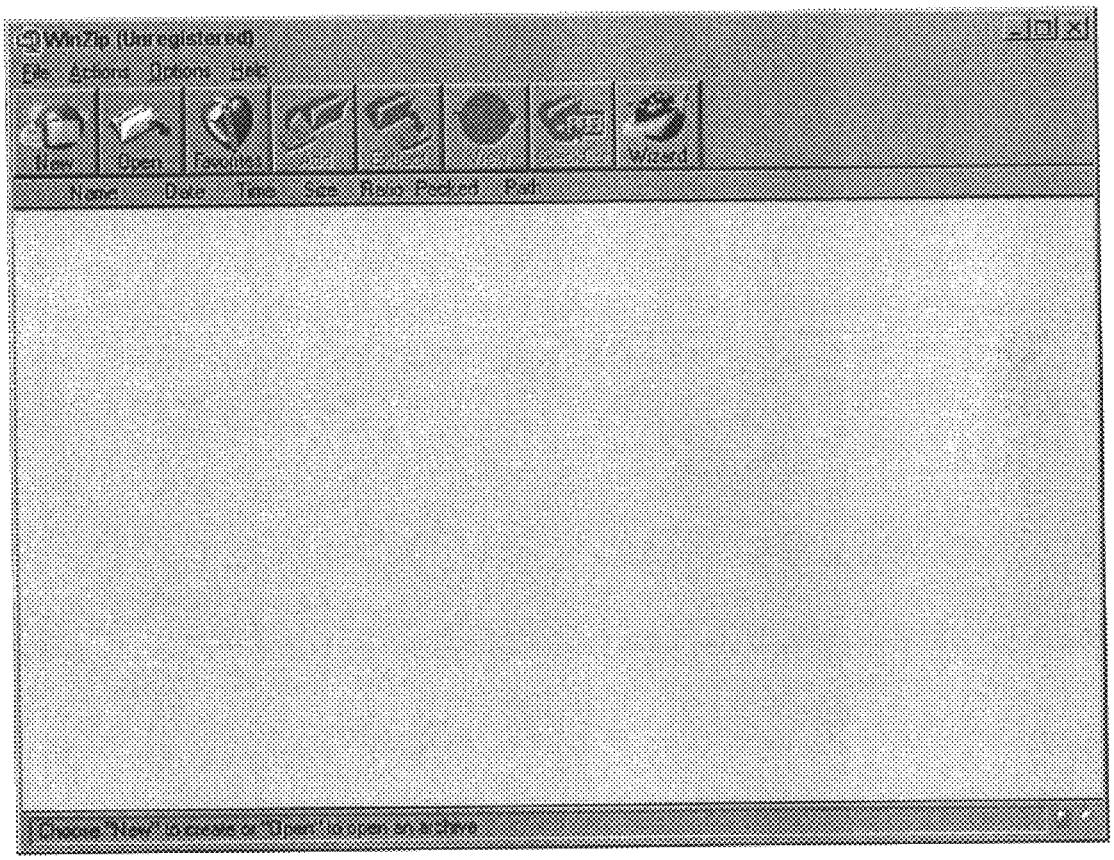
FIG. 13 is an example display screen of the WinZip 6.2 program, which was selected for purchase in FIG. 7, when it executes after completing the licensing procedures.

Once the licensing and purchasing broker has completed its generation and return of a valid electronic license certificate, the requested merchandise is then processed as described in step 412 of FIG. 4. FIG. 13 is an example display screen of the WinZip 6.2 program, which was selected for purchase in FIG. 7, when it executes after completing the licensing procedures.

Figure 14:
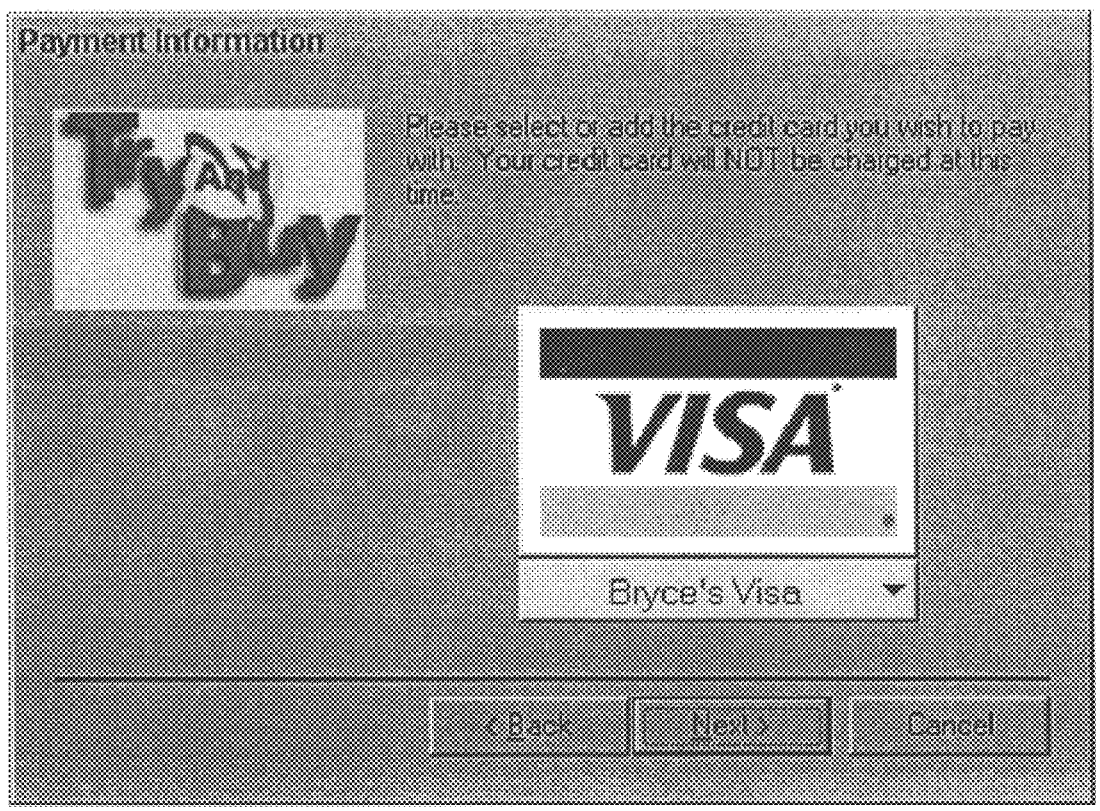
FIG. 14 is an example display screen for selecting a particular credit card.
Figure 15:
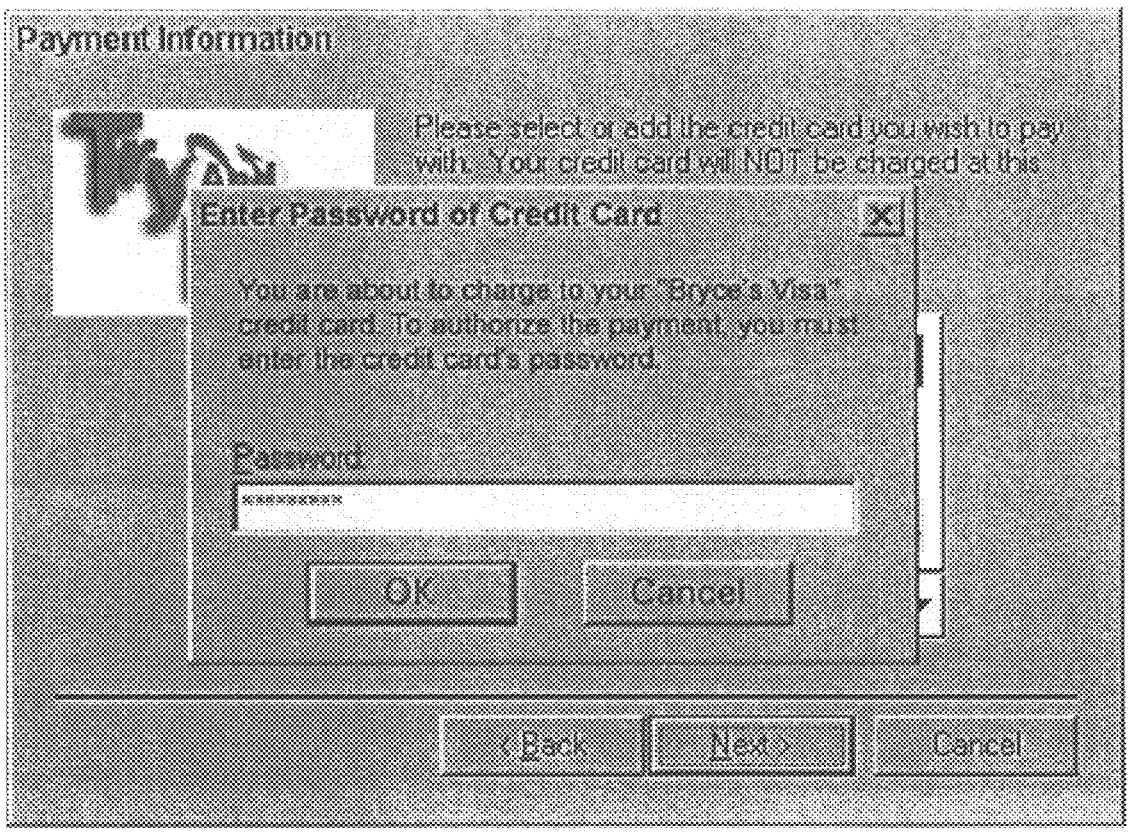
FIG. 15 is an example display screen for entering a password for a selected credit card.
Figure 16:
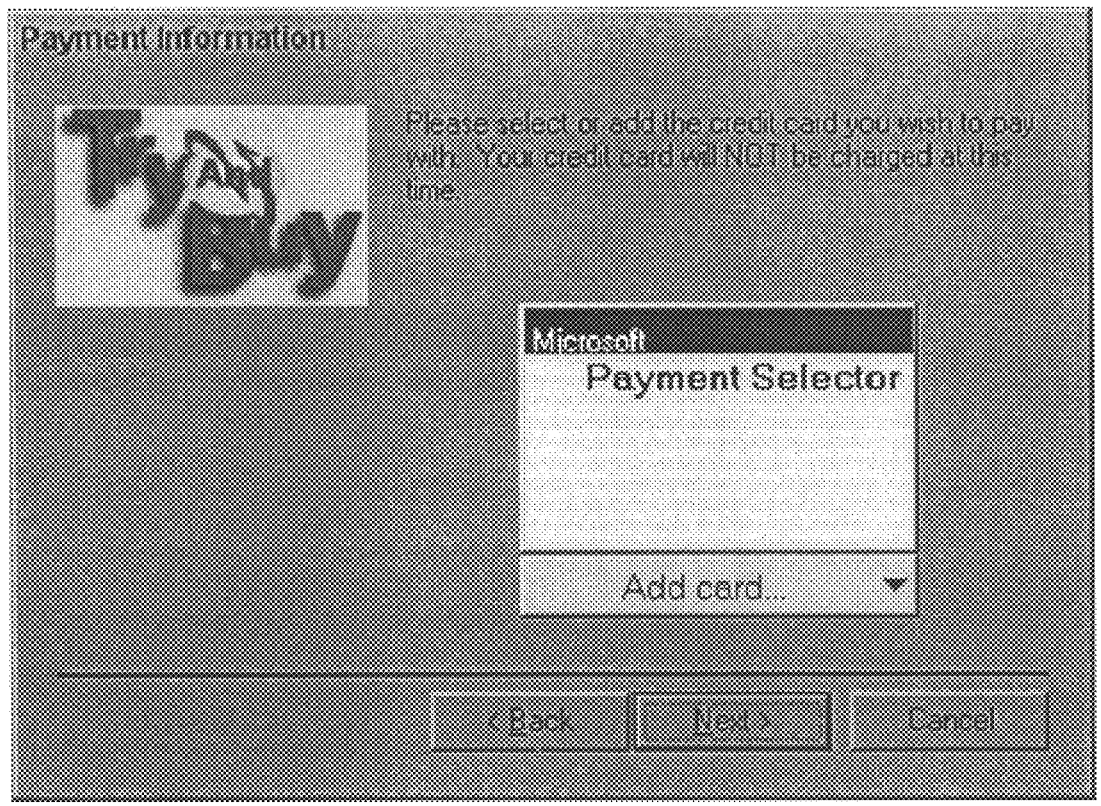
FIG. 16 is an example display screen for adding a new credit card.
Figure 17:
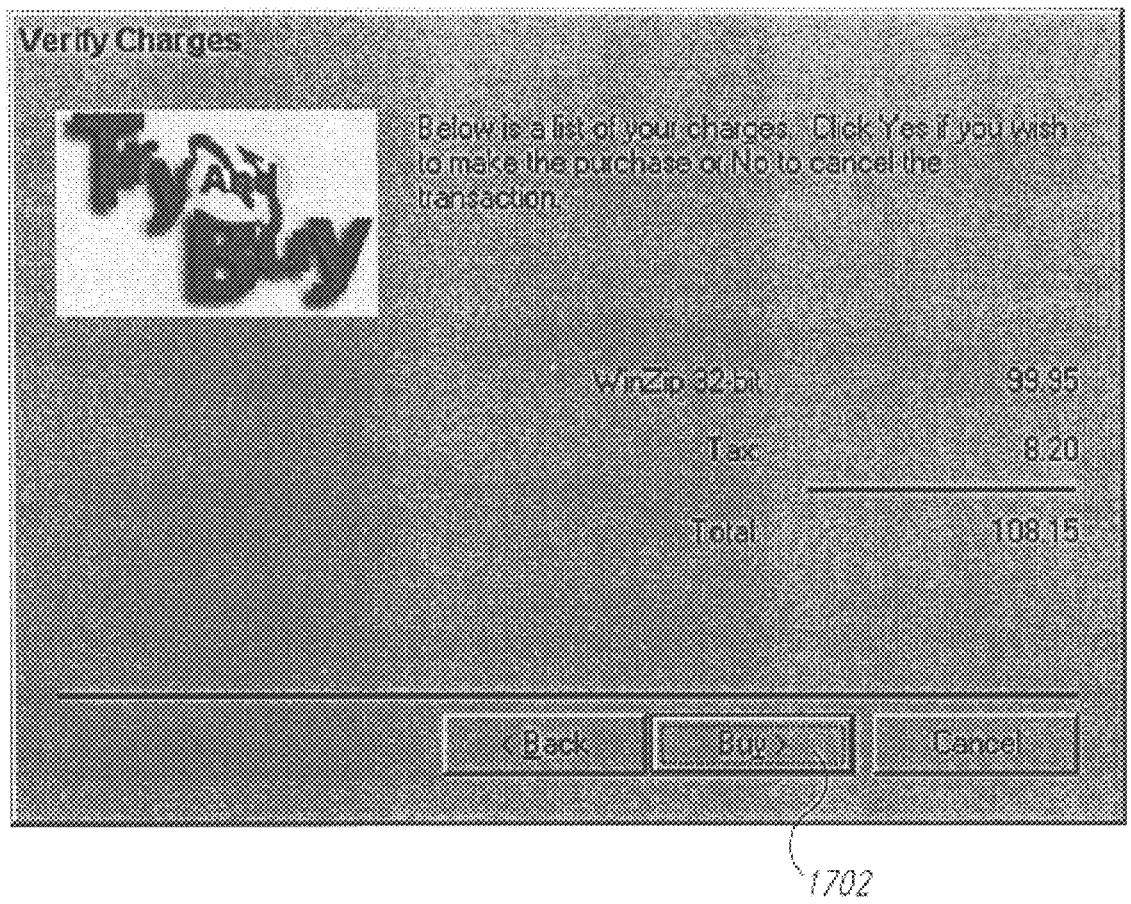
FIG. 17 is an example display screen for allowing a customer to verify an intent to purchase after supplying a method of payment.
Figure 18:
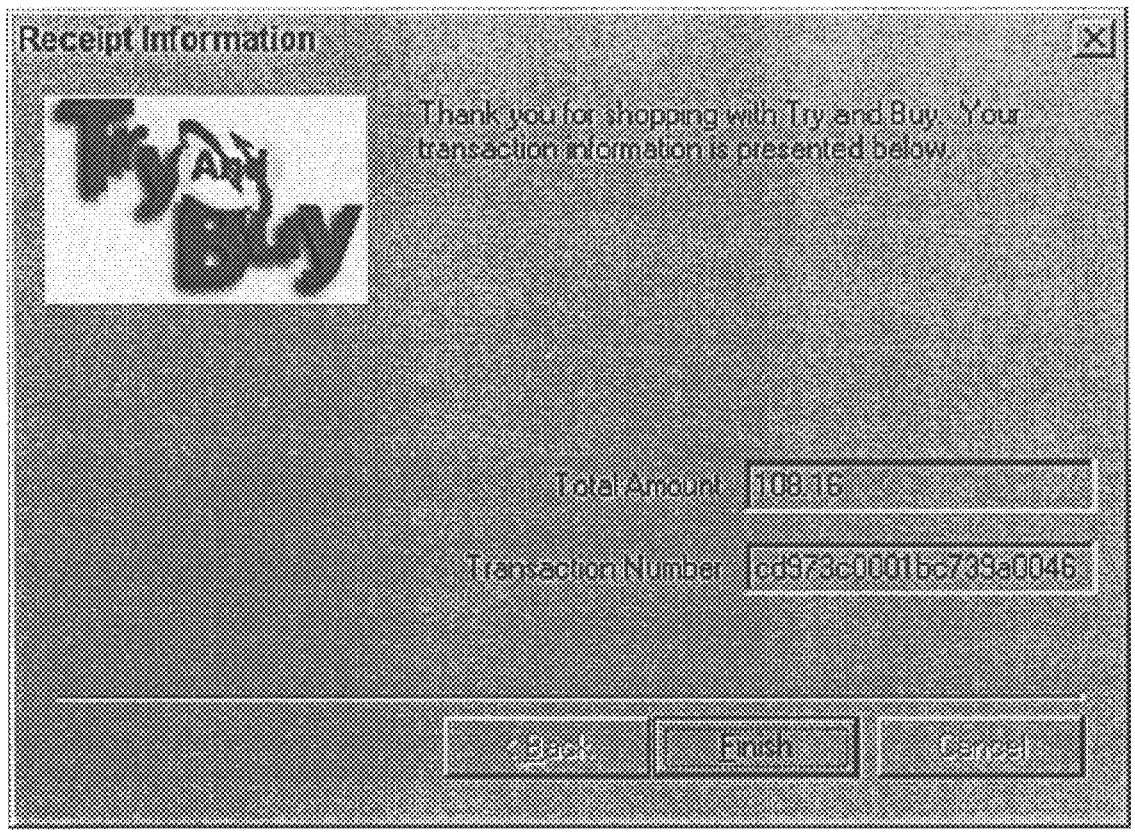
FIG. 18 is an example display screen for indicating that a purchasing transaction has been authorized.

FIGS. 14–17 provide sample user interface display screens that are displayed by the licensing code (via the user interface library) to retrieve method of payment information. These display screens may be presented in response to requests from the licensing and purchasing broker for more information. The particular display screens presented are determined by the user interface library that is associated with the downloaded content file or by a default user interface available for the virtual store (see e.g., SAFEUI.dll 508 in FIG. 5). As mentioned, the appropriate user interface library is determined by the licensing code from the UILibName field of the DCS security information file. FIG. 14 is an example display screen for selecting a particular credit card. FIG. 15 is an example display screen for entering a password for a selected credit card. The credit card data is sent to the licensing and purchasing broker in encrypted form. In an exemplary embodiment, the credit card information is stored on the customer computer system using a secure technique. One such technique is known as "wallet technology." Wallet technology is an ActiveX control supplied by Microsoft Corp., which encrypts credit card information on a client's hard disk and keeps track of all credit cards. FIG. 16 is an example display screen for adding a new credit card. FIG. 17 is an example display screen for allowing a customer to verify an intent to purchase after supplying a method of payment. The display screen includes pricing information, which is supplied to the licensing code by the licensing and purchasing broker using the password generation data repository. Once the user has selected the Buy pushbutton 1702 in FIG. 17 indicating agreement to purchase the merchandise at the displayed price, the credit card (or purchase order) information is forwarded to the licensing and purchasing broker. FIG. 18 is an example display screen for indicating that a purchasing transaction has been authorized by the licensing and purchasing broker and the particular transaction identifier.

Figure 19:
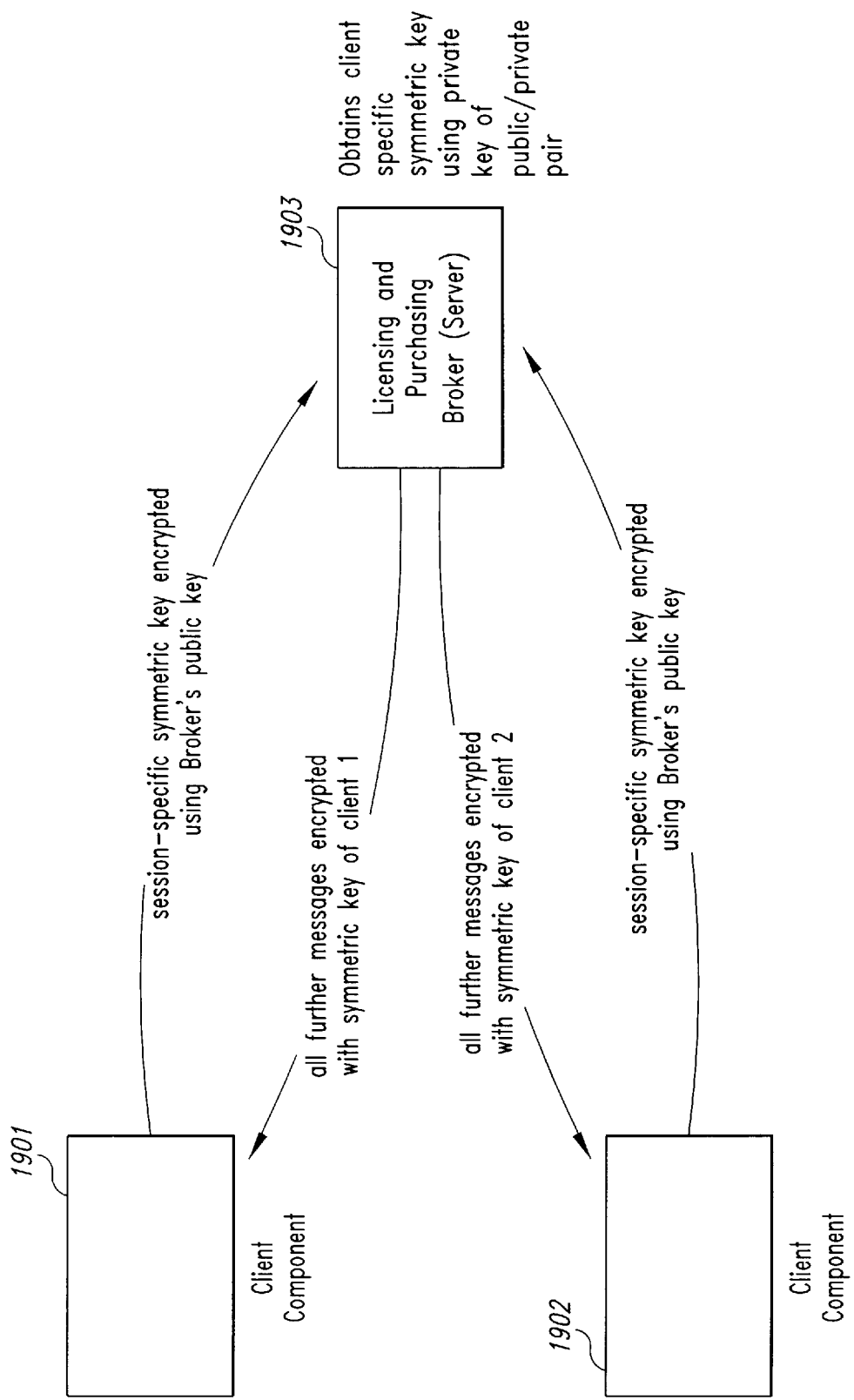
FIG. 19 is an example block diagram that illustrates one technique for ensuring secure communications between a DCS client component and a licensing and purchasing broker.

Communications between the DCS client components and the licensing and purchasing broker are preferably performed using a secure communication methodology. FIG. 19 is an example block diagram that illustrates one technique for ensuring secure communication between a DCS client component and a licensing and purchasing broker. Although FIG. 3 may imply that the downloaded components communicate with the licensing and purchasing broker to request licensing and purchasing and to receive the generated ELC, one skilled in the art will recognize that it is also possible for these components to communicate via a server associated with the virtual store. In FIG. 19, communication between the client components (clients) 1901 and 1902 and the licensing and purchasing broker 1903 depends upon secure key exchange. Secure key exchange is accomplished by sending a client-specific symmetric key using a public/private key algorithm. The client-specific symmetric key is used solely for communication between that client and the licensing and purchasing broker. Specifically, a separate communication session-specific symmetric key is provided by each client for each communication session and is sent to the licensing and purchasing broker 1903 in a session initiation message using the broker's public key. One technique for distributing and obtaining the broker's public key is to use a commercially available digital signature service, such as Verisign. Because the broker 1903 is the only process that knows its own private key, the broker 1903 decrypts the session initiation message using its private key and retrieves the client's session-specific symmetric key. Thereafter, all messages from the broker 1903 to the client 1901 are encrypted by the broker 1903 using the client 1901's symmetric key. Client 1901 is then able to decrypt a received message using the symmetric key that it initially generated and sent to the broker 1903. Client 1901 encrypts messages to send to the broker 1903 also using client 1901's symmetric key. Similarly, the client 1902 sends its own encrypted symmetric key to broker 1903 using the broker's public key. The broker 1903 in turn communicates with the client 1902 using the client-specific symmetric key that corresponds to client 1902.

One skilled in the art will recognize that any algorithm for generating a symmetric key may be utilized. One skilled in the art will also recognize that any symmetric cryptographic algorithm that utilizes a symmetric key may be used to encrypt and decrypt the messages. For example, the DES algorithm, which is described in detail in the Schneier reference, could be utilized. In an exemplary embodiment, the RC5 algorithm, which is a proprietary symmetric key algorithm available from RSA Data Security, Inc., is utilized. In addition, any cryptographic algorithm that uses public/private pairs of keys may be utilized to implement the technique described with reference to FIG. 19. In an exemplary embodiment, the public/private key pairs are generating according to the RSA public-key algorithm. This algorithm is described in further detail in the Schneier reference.

Figure 20:
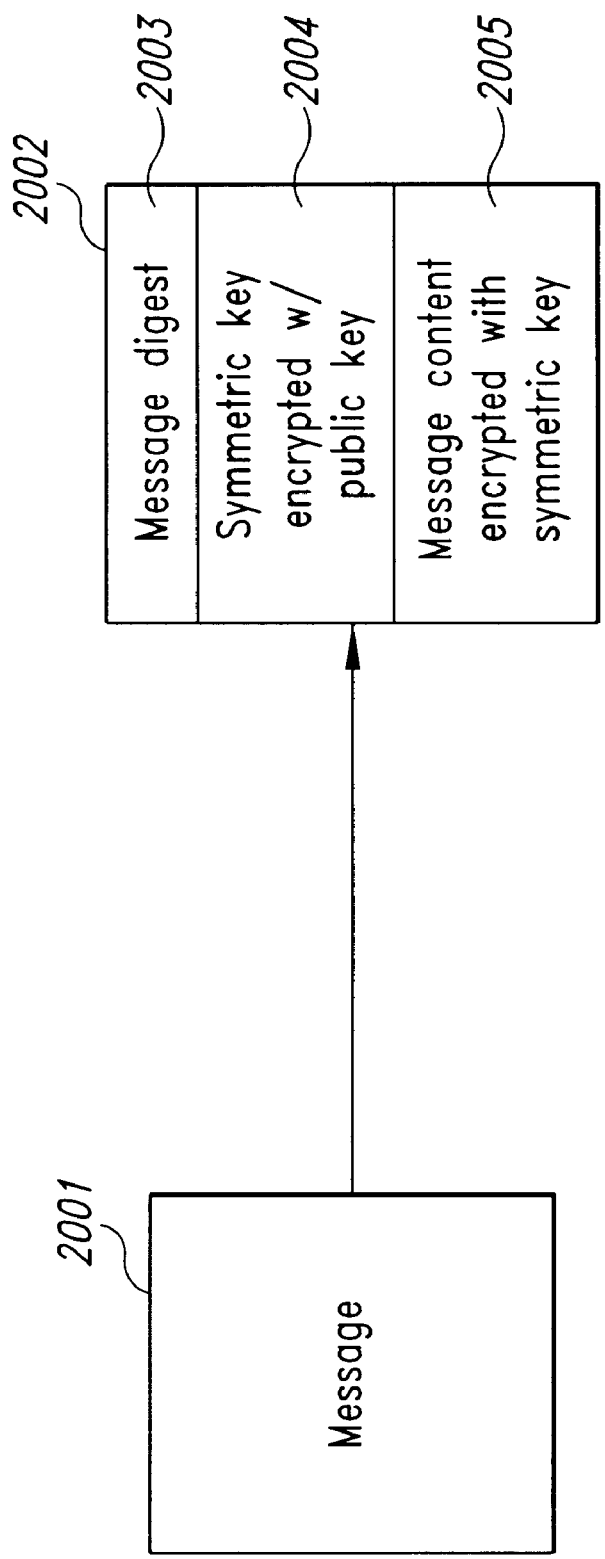
FIG. 20 is an example encrypted message protocol for sending encrypted messages between a DCS client component and a licensing and purchasing broker.

FIG. 20 is an example encrypted message data structure for sending encrypted messages between a DCS client component and a licensing and purchasing broker. Plaintext message 2001 is encrypted as specified in FIG. 19 and stored according to the layout of ciphertext message 2002. Ciphertext message 2002 contains a message digest 2003 and an encrypted symmetric key 2004, which has been encrypted using the licensing and purchasing broker's public key. In addition, field 2005 contains the message content, which has been encrypted using the symmetric key that is sent in encrypted form in field 2004.

Tables 3–5 are example password generation tables stored in the password generation data repository, which is used by the licensing and purchasing broker to generate electronic license certificates.

TABLE 3

Password-Configuration Table

| Field | Type |
|---|---|
| pass-config-id | Varchar |
| password-version | Int |
| secret-key | Varchar |
| developer-id | Varchar |
| expire-password-in | Varchar |
| start-date | Varchar |
| password-output-scheme | Int |
| developer-info | Varchar |
| concurrent-code | Int |
| Licenses | Int |
| soft-licenses | Int |
| program-executions | Int |
| flex-nodelock-machines | Int |
| maximum-usernames | Int |
| release-number | Int |
| minor-release-number | Int |
| hostid-type | Int |
| misc-info | Int |
| min-hostids | Int |
| max-hostids | Int |
| instances | Int |
| emergency-id | Varchar |
| feature-type | Int |
| feature-list | Varchar |

Table 3 is an example password configuration table. As described earlier, a separate password configuration table is provided for each password configuration identifier (pass-config-id). There is a version table in the data repository for translating between a retailer specific product version identifier (the ProductSKUld) and a corresponding password configuration identifier. The fields are used to generate the license parameters for an ELC that corresponds to the determined password configuration identifier. One skilled in the art will recognize that any fields could be stored in the password configuration table. Further, any algorithm for combining the fields in a determinable fashion to encrypt them into a single code that can be decrypted without losing information could be utilized to generate the ELC.

TABLE 4

Generated-Passwords Table

| Field | Type |
|---|---|
| pass-config-id | Varchar |
| user-id | Varchar |
| generation-type | Int |
| date-generated | datetime |
| password | Varchar |

Table 4 is an example table of the actual passwords generated for a particular password configuration identifier (pass-config-id). One of these tables exists for each password configuration identifier. Further, both normal passwords and emergency passwords (discussed below) are stored in this table. User identification information is also included for each generated password.

TABLE 5

Emergency-Password Table

| Field | Type |
|---|---|
| emergency-id | Varchar |
| user-id | Varchar |
| pass-config-id | Varchar |
| start-hour | Int |
| end-hour | Int |
| start-minute | Int |
| end-minute | Int |
| start-day-number | Int |
| end-day-number | Int |
| start-date | Int |
| end-date | Int |
| start-month | Int |
| end-month | Int |
| start-year | Int |
| end-year | Int |
| start-week-number | Int |
| end-week number | Int |

Table 5 is an example emergency password table. An emergency password table is used by the licensing and purchasing broker to generate an emergency password when a customer has for some reason lost a valid ELC (and potentially the merchandise), but has been previously authorized to use the merchandise. Emergency passwords are particularly useful in a scenario where the customer is unable to reach the supplier of the merchandise using available contact information. For example, if the customer's hard disk is destroyed during a weekend, it is useful to be able to re-generate a valid ELC and potentially re-download the merchandise to allow the customer to continue to utilize an already purchased product.

More specifically, the virtual store supports the creation of software on a removable medium, such as a floppy disk, which can be used to recreate the merchandise. When the customer's system hard disk fails, as part of recreating the system, the customer runs a merchandise recovery program from the removable disk. The recovery program has previously stored the boot programs and the component lists associated with the merchandise already purchased so that the relevant files can be resurrected. In addition, the recovery program attempts to create a new ELC using the normal password configuration table (e.g., Table 1). However, if the fields stored in the normal password configuration table do not allow for the creation of a new ELC for that user (for example, the number of uses remaining=0), then an emergency, temporary password is generated. The fields shown in Table 5 are used to generate the emergency ELC when the normal password generation table will not allow for the generation of an additional ELC. In that case, an ELC is generated that expires within a certain amount of time, for example 24 hours, to ensure that the customer calls the supplier's customer service number as soon as possible. The fields of the emergency password table are combined to generate an (encrypted) ELC in the same manner described with reference to Table 3. Emergency passwords once generated are also stored in entries in the generated password table, Table 4.

The description thus far has primarily referred to use of the components of the client portion of the secure digital commerce system by a virtual store. One skilled in the art will recognize that many alternative configurations are possible. For example, a standalone online purchasing application can be used to execute the components of the DCS client to communicate directly to a licensing and purchasing broker to request and receive electronic licensing certificates. In addition, one skilled in the art will recognize that the separate components of the DCS client and the DCS server enable each component to be separately replaceable and separately customized. For example, to generate a customized virtual store, a specialized user interface for licensing and purchasing merchandise can be generated and stored as the user interface component (e.g., SAFEUI.dll 508 in FIG. 5) on the customer computer system. Further, one skilled in the art will recognize that the licensing code incorporated into the encrypted content (or content player) can be replaced in its entirety and can be made supplier specific. In addition, the code used to generate ELCs from the password generation data repository can be optimized to be supplier specific. Further, all of the functions of the DCS server can be provided as licensing and purchasing administrative functions (for example, via an applications programming interface) to enable content suppliers to furnish their own licensing and purchasing brokers.

The secure digital commerce system can also be utilized to support a combination of transactions pertaining to the online delivery of goods with transactions pertaining to physically deliverable goods and services. For example, along with the purchase of the WinZip 6.2 computer program, the virtual store may offer merchandise, such as mugs, T-shirts, travel bags, and even support service packages that cannot be delivered online. In these instances, the licensing and purchasing broker is additionally responsible for classifying received requests into online deliverables (ESD items) and into physical deliverables (non-ESD items) and is responsible for ordering and purchasing the non-ESD items.

Figure 21:
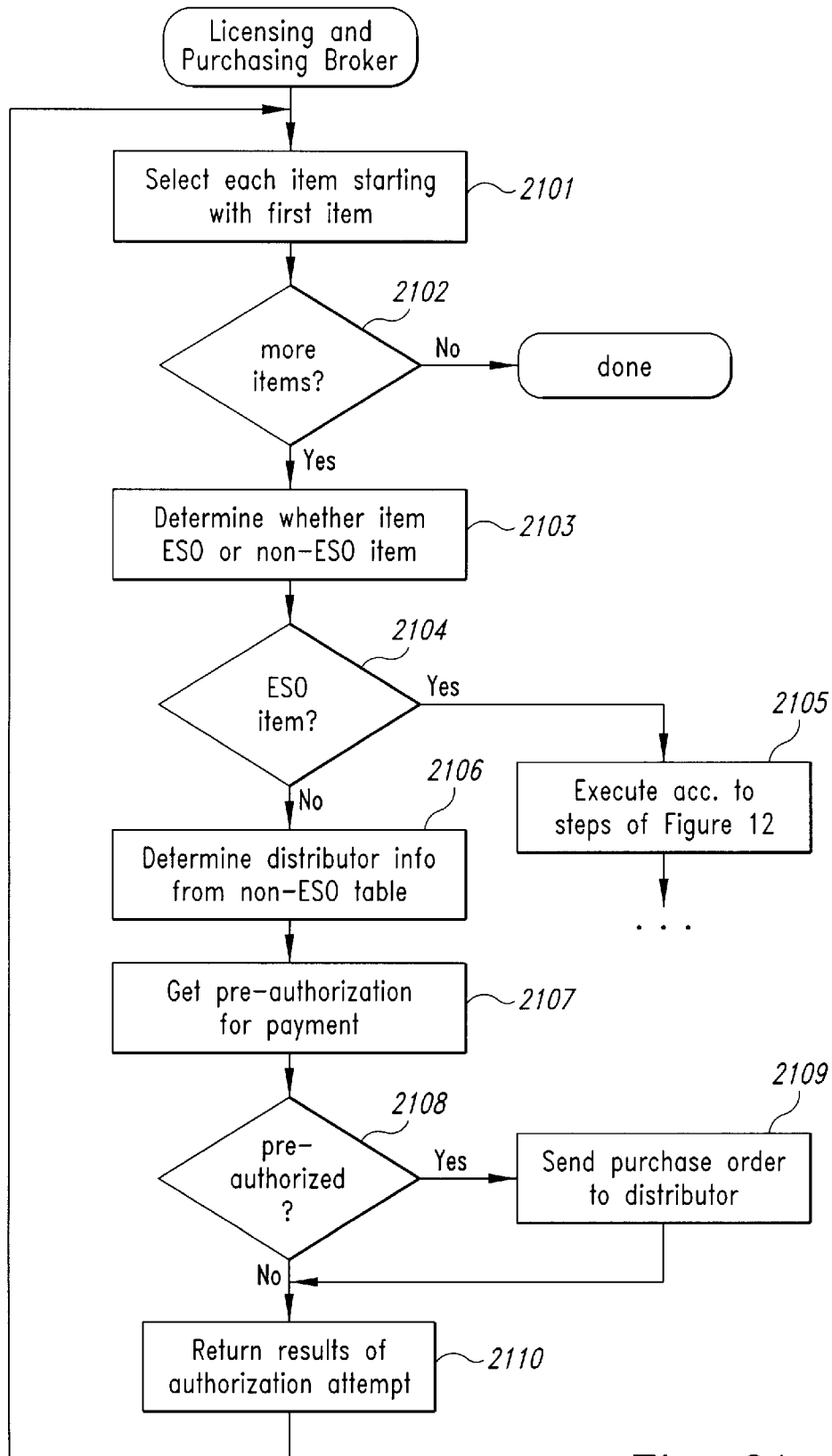
FIG. 21 is an example flow diagram of the additional steps performed by a licensing and purchasing broker of the secure digital commerce system to support non-ESD transactions.

FIG. 21 is an example flow diagram of the additional steps performed by a licensing and purchasing broker of the secure digital commerce system to support non-ESD transactions. In step 2102, the licensing and purchasing broker selects the next item of merchandise requested starting with the first. FIG. 21 assumes that each HTTP request may request more than one item of merchandise. For example, a user interface library may offer additional non-ESD merchandise, which can be purchased at the same time that a customer purchases an ESD item. The user interface library generates and sends to the licensing and purchasing broker an HTTP request, which requests the purchase of multiple items of merchandise. For each item in the purchase request, in steps 2103–2110, the broker processes the item in accordance with an indicated purchasing option for the item.

Specifically, in step 2102, the broker determines whether there are more items remaining to be processed for the request and, if so, continues in step 2103, else finishes processing. In step 2103, the licensing and purchasing broker determines whether the item is an ESD item or a non-ESD item. One mechanism used to determine whether the item is an ESD or a non-ESD item is to store a flag in the version table in the password generation data repository. For each purchasable item (ProductSkuId), the version table stores either a password configuration identifier or a distributor information identifier. In step 2104, if the item is an ESD item, then the broker continues in step 2105, else continues in step 2106. In step 2105, the broker executes the steps previously discussed with reference to FIG. 12 for items that are deliverable online. In step 2106, the broker determines distributor contact information for the non-ESD item from a distributor information table stored within a data repository. The distributor information table for non-ESD transactions can be stored along with the password generation tables in the password generation data repository or in its own data repository. The distributor information stored in the table includes sufficient location information for contacting a distributor from whom the item can be purchased using an electronic request. In step 2107, the broker obtains preauthorization information for a method of payment specified by the customer. It is assumed in this step that such information has been already obtained. If necessary, however, the broker sends appropriate requests to the code that initiated the purchase request (for example, the user interface library) to obtain method of payment information from the user and to continue accordingly. Preauthorization is necessitated by non-ESD purchases, which require a shipment date before the broker is able to charge the purchase to a customer's credit card. The preauthorization is performed by the payment processing function (e.g., the payment processing function 309 in FIG. 3). In step 2108, if the purchase is preauthorized, then the broker continues in step 2109, else continues in step 2110. In step 2109, the broker sends a purchase order to the located distributor for the merchandise using a well-known Electronic Data Interchange ("EDI") format and commercial EDI products, such as those provided by Digital Corporation. One skilled in the art will recognize that any mechanism that allows information for electronically providing a purchase order would be operable with the licensing and purchasing broker. In step 2110, the broker returns the results of the preauthorization attempt to the requesting routine, and then returns to the beginning of the loop in step 2101.

To complete the purchasing transaction for a non-ESD item, the licensing and purchasing broker waits until it is informed by the distributor that the distributor will fulfill the requested purchase order (ship the merchandise) on a particular date. At that time, the licensing and purchasing broker contacts the payment processing function to charge the purchasing transaction to the customer and to credit the distributor.

One skilled in the art will recognize that other variations for processing ESD and non-ESD transactions would also operate with the licensing and purchasing broker. For example, instead of the user interface library offering related non-ESD merchandise, the WEB pages of the virtual store may offer both ESD and non-ESD items for purchase. In this scenario, a graphical icon (or similar object) associated with each non-ESD item available for purchase is displayed in addition to icons for ESD items. However, unlike the icons associated with ESD items, these icons are not linked to a download file that causes components to be downloaded, because online delivery is not possible. Instead, other virtual store code is linked to the non-ESD icons, which uses the purchasing library routines to send purchasing requests for non-ESD items to the licensing and purchasing broker.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to other client/server architectures, not necessarily the exemplary Internet based, HTTP model described above. These and other changes may be made to the invention in light of the above detailed description. Accordingly, the invention is not limited by the disclosure, but instead the scope of the present invention is to be determined by the following claims.

What is claimed is:

1. A computer system for conducting electronic commerce, including:

a store computer that receives requests for electronic data from a client computer and that, in response to receiving the request, sends to the client computer a download component that coordinates the download of the electronic data;

a supplier computer that receives a request from the download component of the client computer to download the electronic data and that, in response to receiving the request, sends the electronic data and a licensing component to the client computer, the licensing component for coordinating the licensing of the electronic data; and a licensing computer that receives a request from the licensing component of the client computer to license electronic data and that, in response to receiving the request, determines whether access to the electronic data is to be allowed at the client computer, and when access is allowed, sends a notification that access is allowed to the client computer.

2. The system of claim 1 wherein the licensing computer is for receiving a request from the licensing component for merchandise that is not transmitted online and for transmitting an order for physical shipment of the merchandise that is not transmitted online.

3. The system of claim 1 including a payment processing computer for processing payments for the electronic data.

4. The system of claim 1 wherein the store computer, the supplier computer, and the licensing computer are separate computers.

5. The system of claim 1 wherein the store computer, the supplier computer, and the licensing computer are separate web servers.

6. The system of claim 1 wherein the virtual store computer, the supplier computer, and the licensing computer are separate web sites.

7. A method in a computer system for conducting electronic commerce, including:

requesting a first web server to order electronic data;

receiving in response to the request a download component for coordinating the download of the electronic data; and under control of the download component, downloading from a second web server the electronic data.

8. The method of claim 7 wherein the download component also downloads a licensing component and including:

under control of the licensing component, requesting and receiving from a third web server a license for using the electronic data; and using the electronic data in accordance with the received license.

9. The method of claim 8 including:

under control of a payment component, authorizing payment for the electronic data.

10. The method of claim 7 wherein the downloaded electronic data is encrypted.

11. A method in a store computer for coordinating electronic commerce, the method including:

receiving from a client computer a request to purchase electronic data; and in response to receiving the request, sending to the client computer a download component, the download component for coordinating the download of the electronic data from a supplier computer to the client computer, the supplier computer for downloading to the client computer the electronic data when requested by the download component.

12. The method of claim 11 wherein the supplier computer downloads a licensing component that requests a licensing computer for a license to use the electronic data.

13. The method of claim 11 wherein the store computer, the client computer, and the supplier computer communicate via the Internet.

14. A first computer for coordinating electronic commerce, including:

means for receiving from a second computer a request to purchase electronic data; and means for, in response to receiving the request, sending to the second computer a download component, the download component for coordinating the download of the electronic data from a third computer to the second computer, the third computer for downloading to the second computer the electronic data when requested by the download component.

15. The first computer of claim 14 wherein the third computer downloads a licensing component that requests a fourth computer for a license to use the electronic data.

16. The first computer of claim 14 wherein the computers communicate via the Internet.

* * * * *